(12) United States Patent
Tsai et al.

(10) Patent No.: US 11,531,004 B2
(45) Date of Patent: Dec. 20, 2022

(54) DISPOSABLE MULTI-CHANNEL BIO-ANALYSIS CARTRIDGE AND CAPILLARY ELECTROPHORESIS SYSTEM FOR CONDUCTING BIO-ANALYSIS USING SAME

(71) Applicant: BIOPTIC, INC., New Taipei (TW)

(72) Inventors: Shou-Kuan Tsai, New Taipei (TW); Varouj D. Amirkhanian, La Crescenta, CA (US)

(73) Assignee: BIOPTIC, INC., New Taipei (TW)

( * ) Notice: Subject to any disclaimer, the term of this patent is extended or adjusted under 35 U.S.C. 154(b) by 374 days.

(21) Appl. No.: 16/697,061

(22) Filed: Nov. 26, 2019

(65) Prior Publication Data
US 2020/0096479 A1 Mar. 26, 2020

Related U.S. Application Data

(63) Continuation of application No. 15/438,754, filed on Feb. 21, 2017, now abandoned, which is a
(Continued)

(51) Int. Cl.
*G01N 27/447* (2006.01)
*B01L 3/00* (2006.01)

(52) U.S. Cl.
CPC ...... *G01N 27/44726* (2013.01); *B01L 3/5025* (2013.01); *G01N 27/44721* (2013.01);
(Continued)

(58) Field of Classification Search
CPC ......... G01N 27/44726; G01N 21/6486; G01N 27/44721; G01N 21/64; G01N 27/44791;
(Continued)

(56) References Cited

U.S. PATENT DOCUMENTS 7,208,072 B2 * 4/2007 Amirkhanian ... G01N 27/44721
204/603
7,309,409 B2 * 12/2007 Amirkhanian ... G01N 27/44721
204/603
(Continued)

FOREIGN PATENT DOCUMENTS

| WO | 01/81909 | 11/2001 |
|---|---|---|
| WO | 2010/126897 | 11/2010 |

(Continued)

OTHER PUBLICATIONS

International Search Report of Related PCT App. No. PCT/US2017/025206.

*Primary Examiner* — Joshua L Allen
(74) *Attorney, Agent, or Firm* — Liu & Liu

(57) ABSTRACT

A multi-channel bio-separation system configured to utilize a cartridge that has a individual, separate integrated reagent (i.e., a separation buffer) reservoir dedicated for each separation channel. The multiple channels may have different characteristics, such as different separation medium of different chemistries, different separation length, different channel sizes and internal coatings. In one embodiment, the cartridge does not include integrated detection optics. Not all channels need to be operative. One or more of the channels in the cartridge may be "dummy channels" that are not operative (e.g., not provided with a capillary tube). A capillary tube may be routed between the reservoir/electrode (anode) of one channel to an electrode (cathode) in another channel, thus allowing a longer length of capillary tube to be used to define a longer separation channel to improve resolution.

14 Claims, 21 Drawing Sheets

Related U.S. Application Data continuation-in-part of application No. 14/720,723, filed on May 22, 2015, now abandoned.

(60) Provisional application No. 62/297,073, filed on Feb. 18, 2016.

(52) U.S. Cl.
CPC .................. *G01N 27/44791* (2013.01); *B01L 2200/0631* (2013.01); *B01L 2300/0627* (2013.01); *B01L 2300/0838* (2013.01); *B01L 2300/0864* (2013.01); *B01L 2300/12* (2013.01); *B01L 2400/0421* (2013.01)

(58) Field of Classification Search
CPC ........... B01L 3/5025; B01L 2300/0864; B01L 2300/0838; B01L 2400/0421; B01L 2200/0631; B01L 2300/0627; B01L 2300/12
See application file for complete search history.

(56) References Cited

U.S. PATENT DOCUMENTS

| | | | |
|---|---|---|---|
| 8,163,152 B1* | 4/2012 | Amirkhanian ... | G01N 27/44747 204/455 |
| 9,649,631 B2* | 5/2017 | Bienvenue .............. | B01L 7/525 |
| 2005/0016852 A1* | 1/2005 | Amirkhanian ... | G01N 27/44782 204/600 |
| 2005/0189219 A1* | 9/2005 | Amirkhanian ... | G01N 27/44704 204/403.01 |
| 2009/0221059 A1* | 9/2009 | Williams ................ | B01L 9/527 435/287.2 |
| 2010/0108513 A1* | 5/2010 | Amirkhanian ... | G01N 27/44721 204/452 |
| 2010/0170799 A1* | 7/2010 | Amirkhanian ....... | G01N 21/645 204/602 |
| 2012/0168312 A1* | 7/2012 | Tsai ................. | G01N 27/44756 204/603 |

FOREIGN PATENT DOCUMENTS

| | | |
|---|---|---|
| WO | 2012/027175 | 3/2012 |
| WO | 2015/106356 | 7/2015 |

* cited by examiner

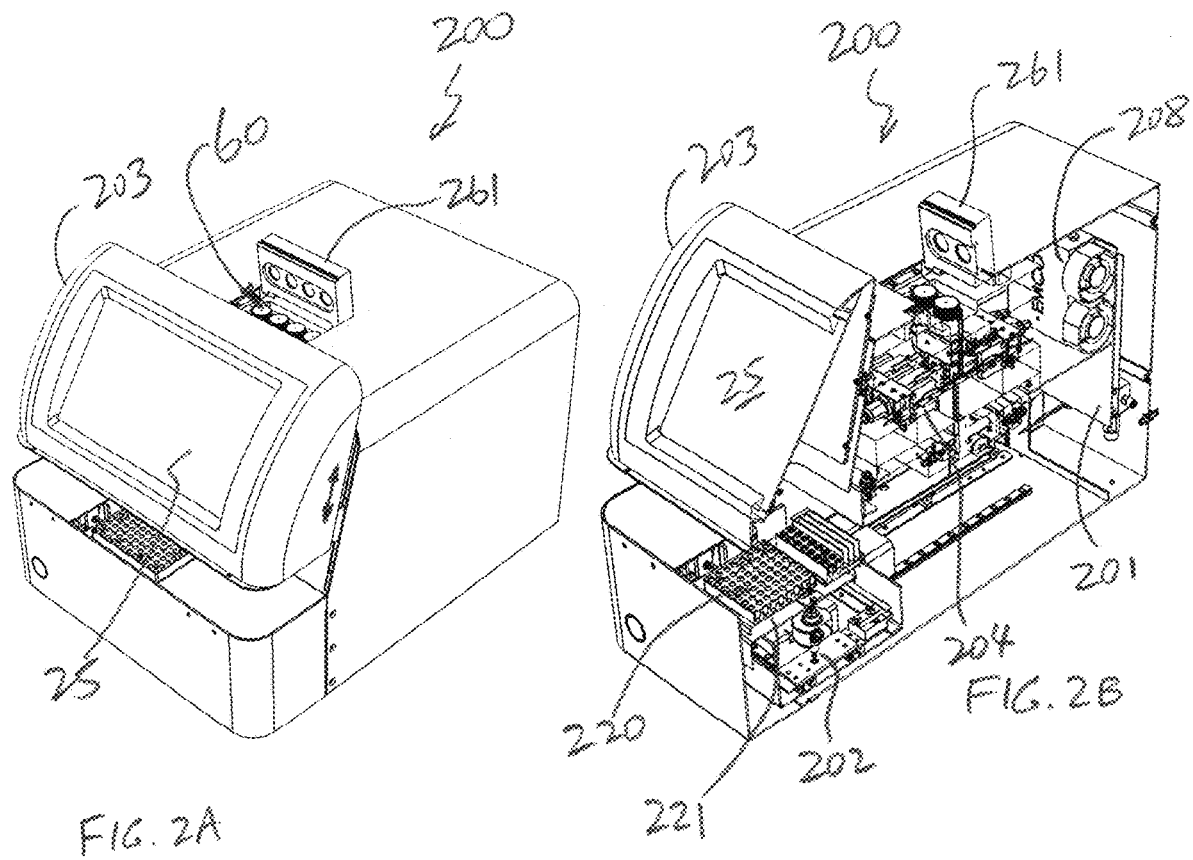
FIG. 2A
FIG. 2B
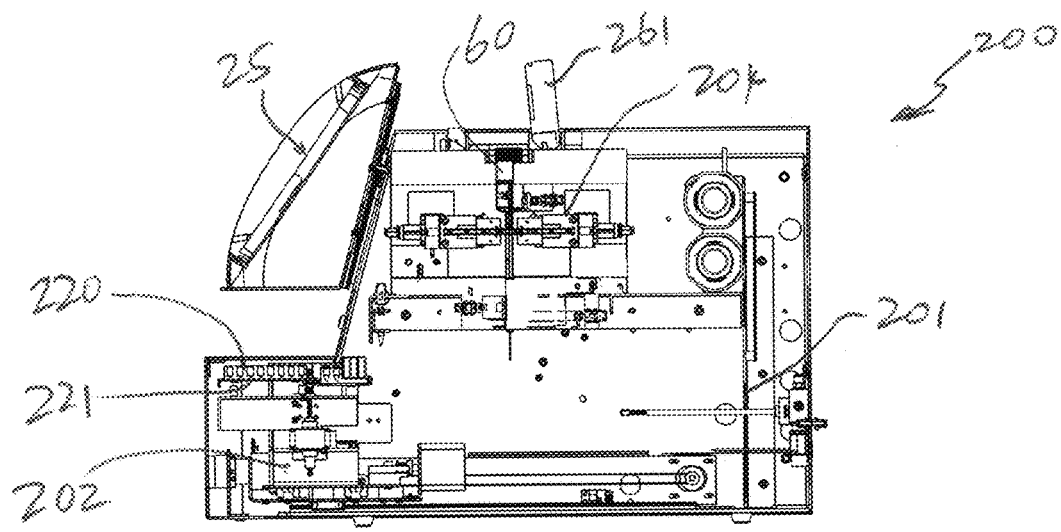
FIG. 2C

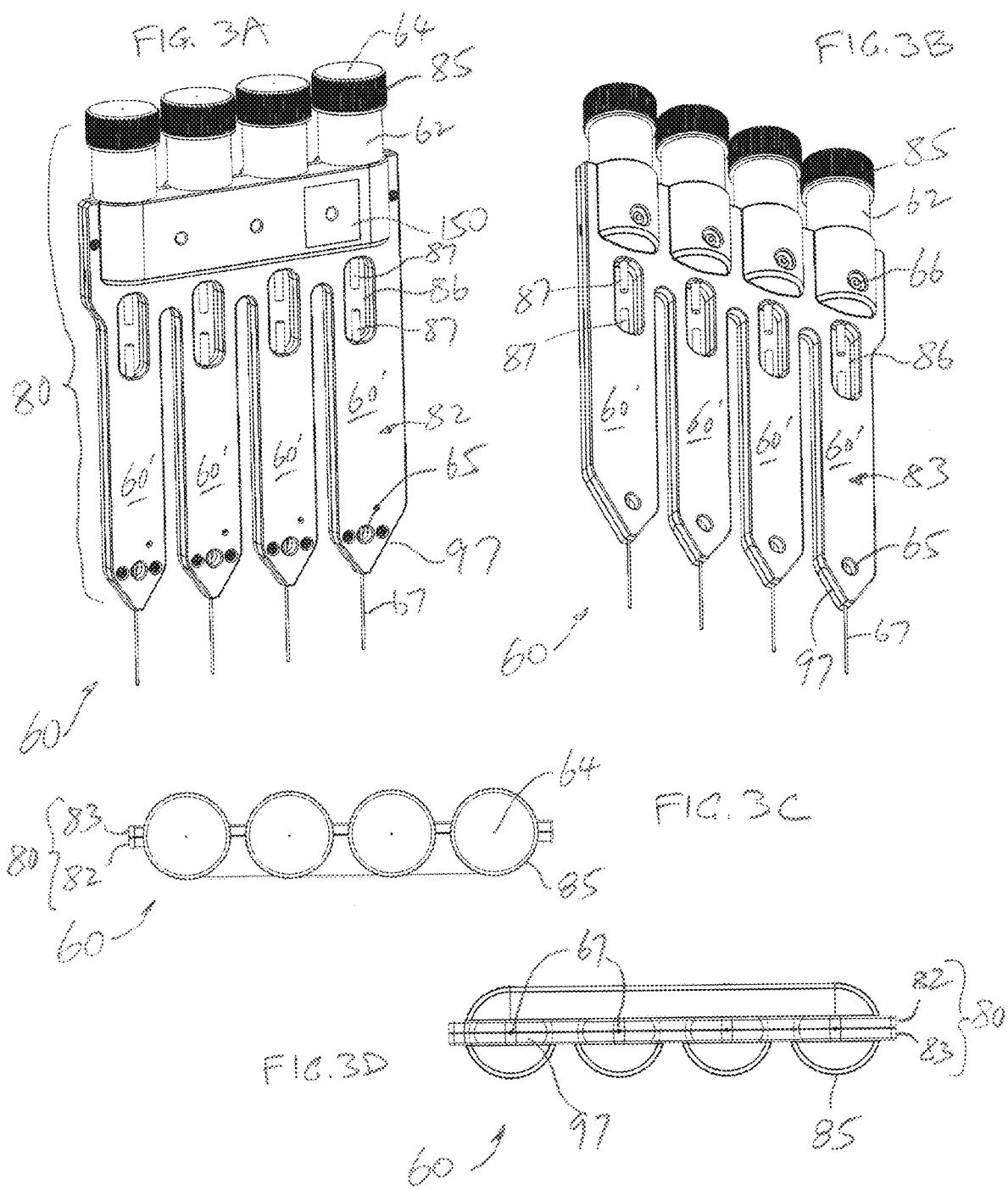

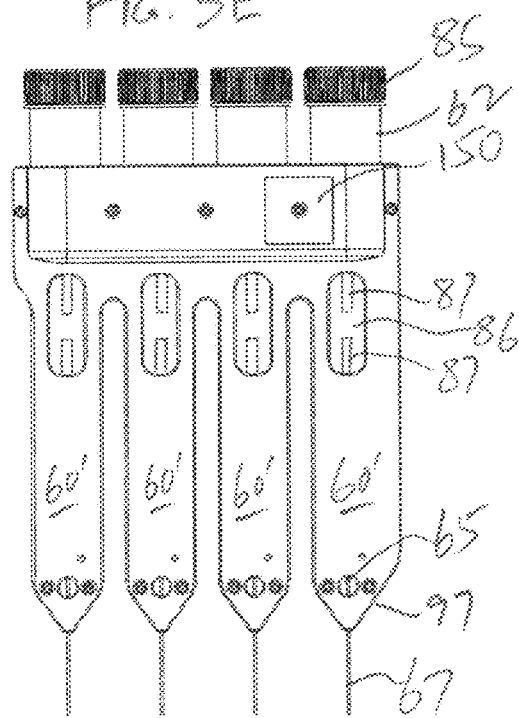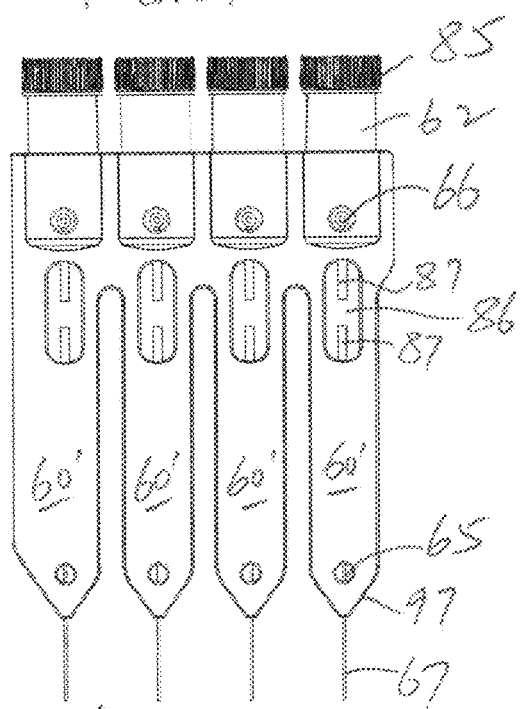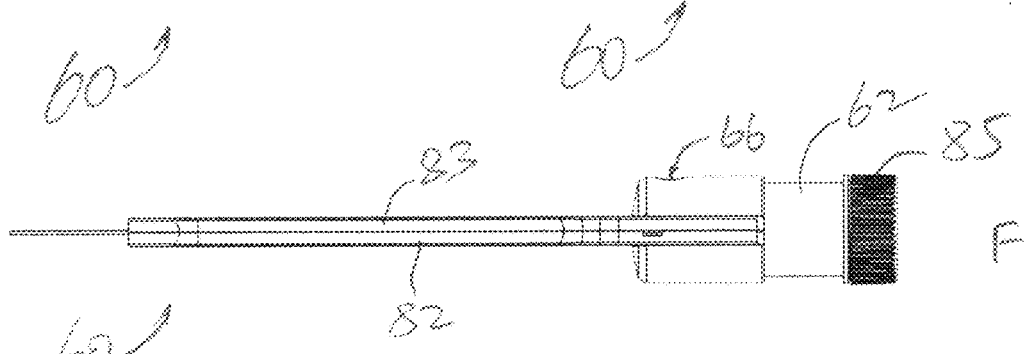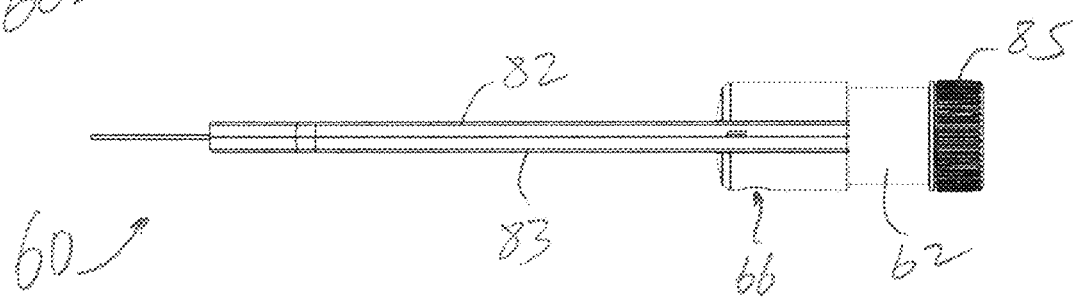

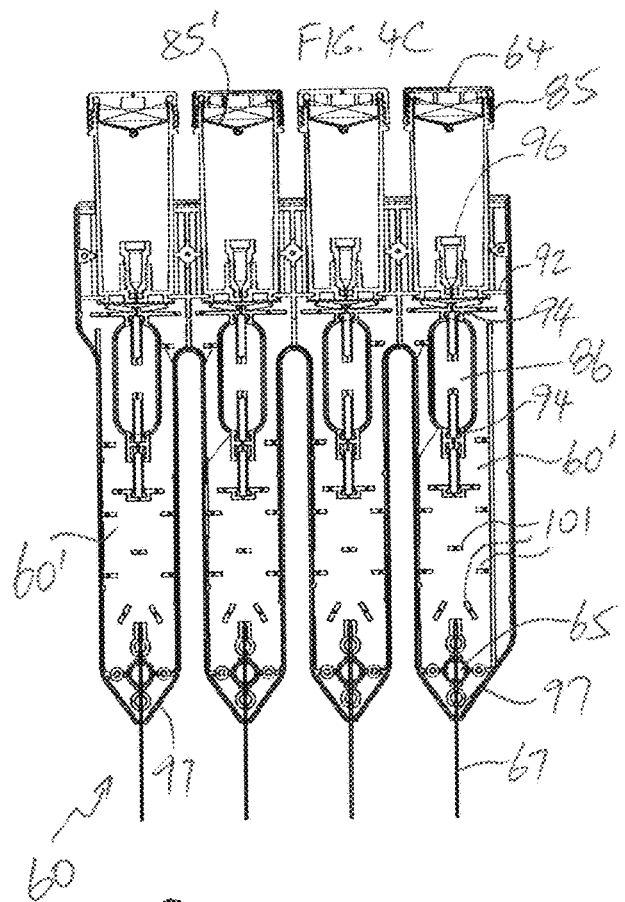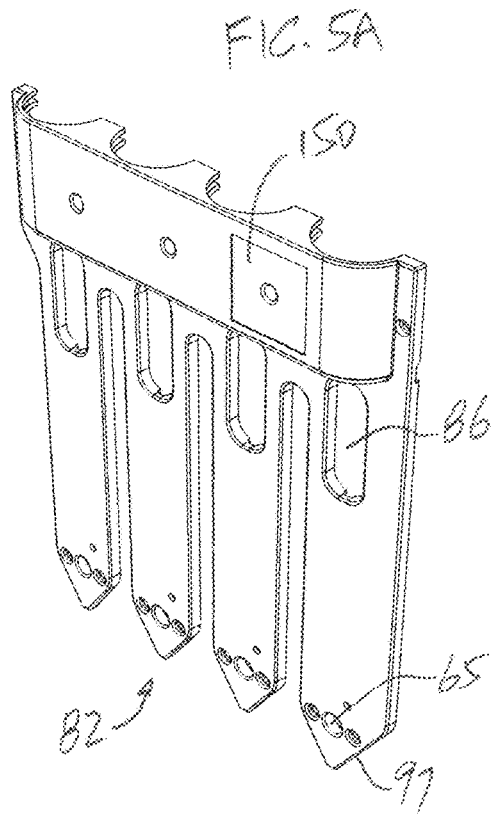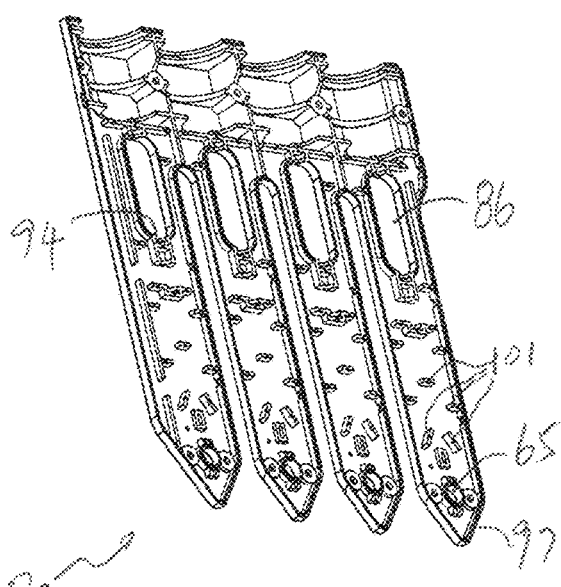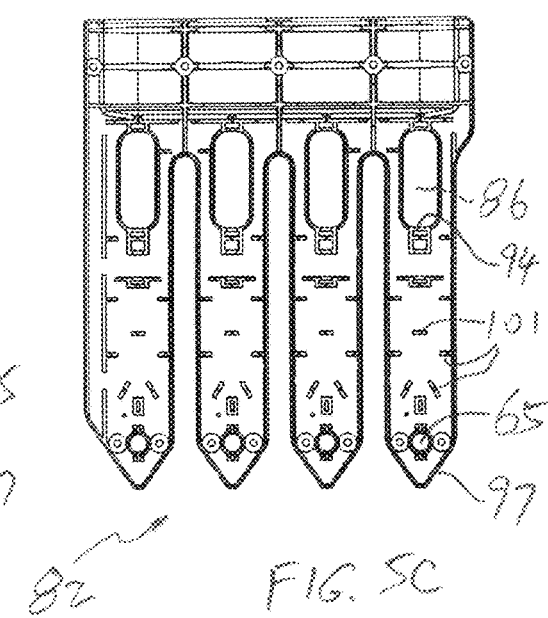

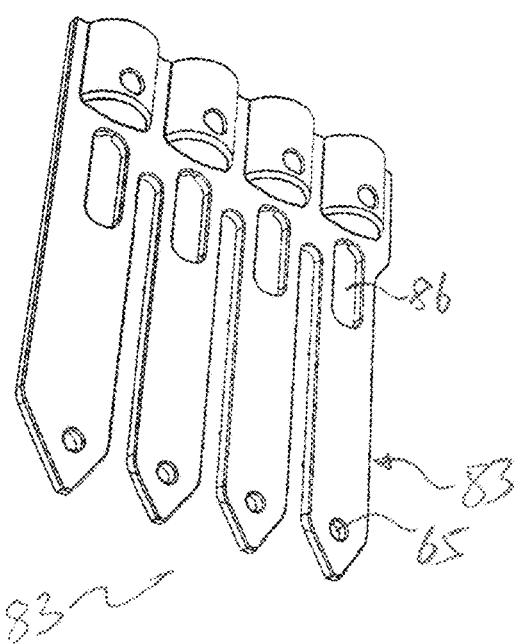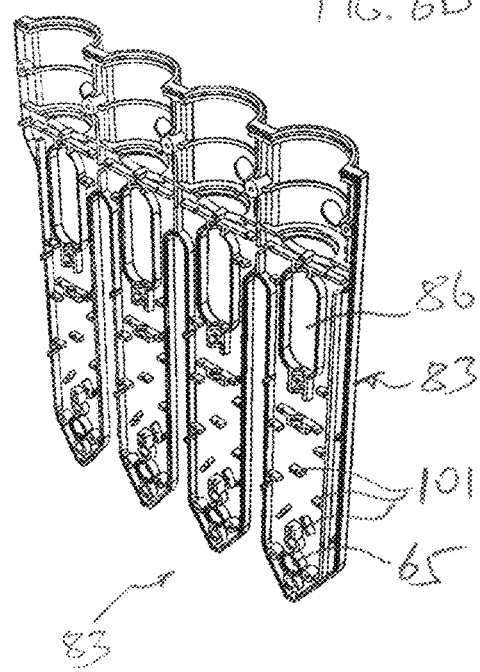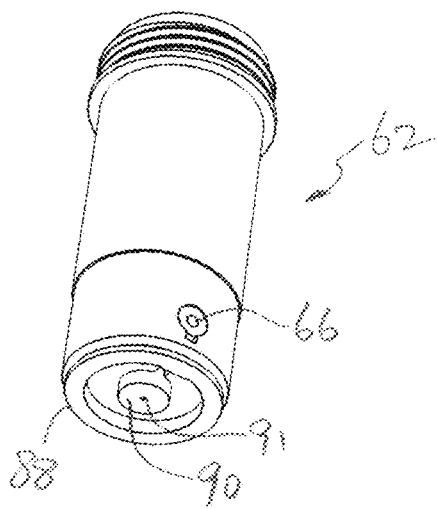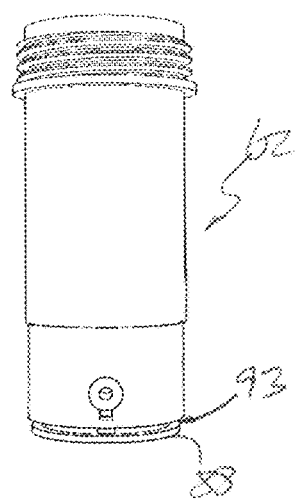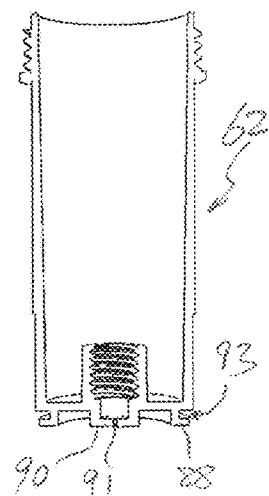

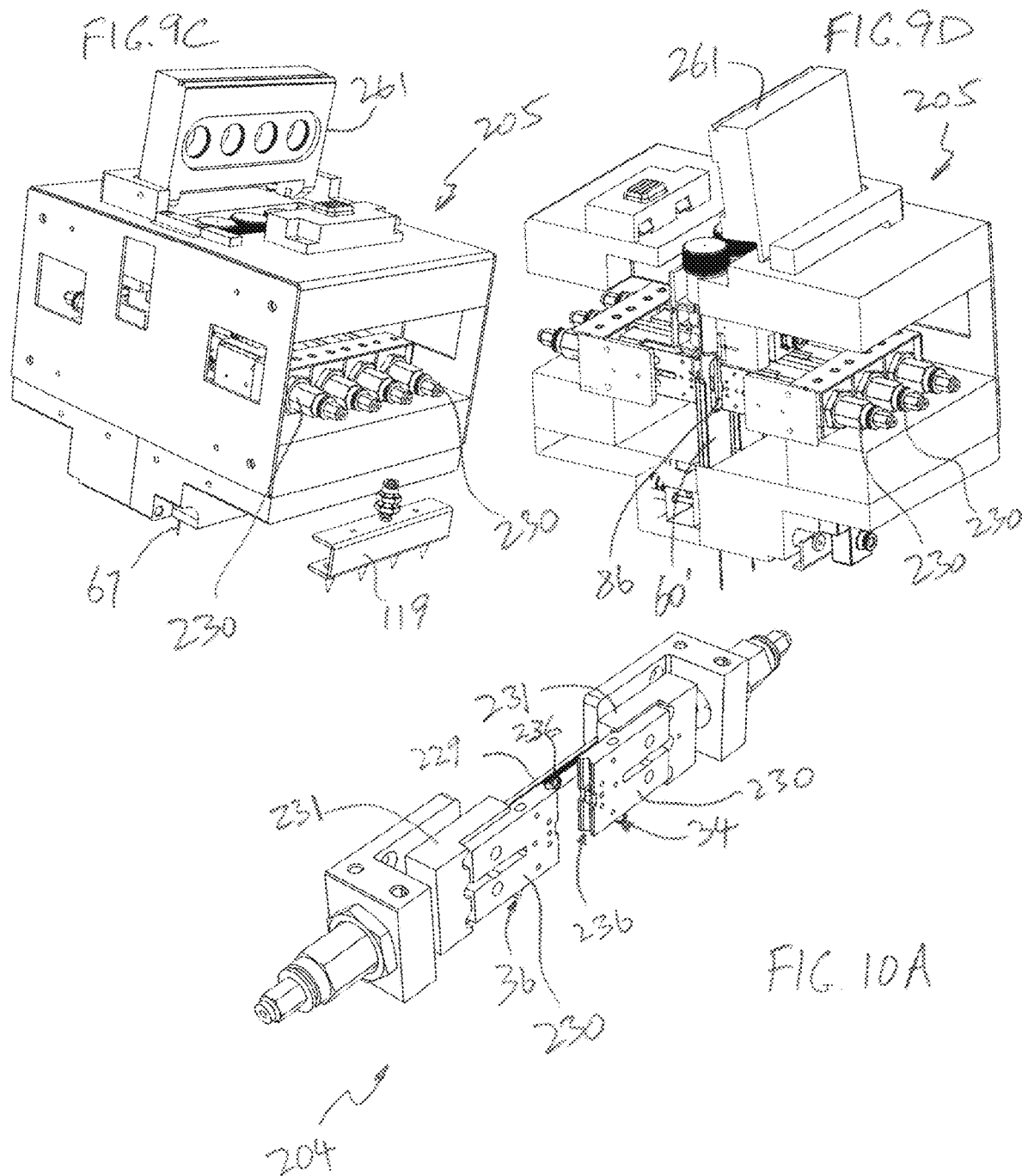

DISPOSABLE MULTI-CHANNEL BIO-ANALYSIS CARTRIDGE AND CAPILLARY ELECTROPHORESIS SYSTEM FOR CONDUCTING BIO-ANALYSIS USING SAME

PRIORITY CLAIM

This application is a continuation application of U.S. Utility patent application Ser. No. 15/438,754 filed on Feb. 21, 2017, which: (a) claimed the priority of U.S. Provisional Patent Application No. 62/297,073 filed on Feb. 18, 2016; and (b) was a continuation-in-part of U.S. Utility patent application Ser. No. 14/720,723 filed on May 22, 2015. These applications and all documents discussed below are fully incorporated by reference as if fully set forth herein.

BACKGROUND OF THE INVENTION

1. Field of the Invention

The present invention relates to bio-analysis, in particular a cartridge and a capillary electrophoresis instrument using same for performing bio-analysis.

2. Description of Related Art

Currently, most of bio-separation tools applied in the laboratories utilizes slab gel based electrophoresis technologies, which have routinely been used for bio-analysis of bio-molecules (i.e. DNA, Protein & Carbohydrate) applications since their inception more than 20 years ago. However, slab gel electrophoresis for bio-analysis is labor intensive and needs to be drastically improved in terms of resolving power, throughput and cost per sample.

Capillary electrophoresis (CE) is a micro fluidic approach to gel-electrophoresis (micro-channel device to simplify gel-electrophoresis), whose greatest advantage is its diverse range of applications. CE technology is commonly accepted by the biotechnology industry specifically in the nucleic acid-based testing as a reliable, high resolution and highly sensitive detection tool, and CE has been applied for, e.g., protein, carbohydrate and DNA-related analyses such as oligonucleotides analysis, DNA sequencing, and dsDNA fragments analysis, and glycan profiling. CE is commonly avoided in routine analysis because it is reputed to be a troublesome technique with high failure rates. However, this is no longer true because instrument manufacturers have drastically improved instrument design and overall CE knowledge has increased. There are three key factors for reducing failure rate and producing accurate, precise and robust CE data: operator training, system stability, and operation ease of the instrument with low maintenance.

Without a doubt, CE with laser-induced fluorescence (LIF) is one of the most powerful analytical tools for rapid, high sensitivity and high-resolution bio-analysis. However, the current selling price for CE-based LIF systems is much more expensive than traditional slab-gel based bio-analysis systems due to the complicated optical detection mechanism. The expensive CE-based systems are thus out of reach for all but a few well-funded laboratories and seems to be a high-cost barrier for the expansion of bio-analysis applications/business.

U.S. Pat. No. 8,784,626, commonly assigned to the assignee of the present invention, discloses a simplified, low cost, efficient, highly sensitive, non-moving and stable micro-optical detection configuration for bio-separation (e.g., capillary electrophoresis) through a separation channel (e.g., defined by a column) filled with a separation support medium (e.g., a liquid or sieving gel including a running buffer). More particularly, the disclosed invention is directed to an improved detection configuration that includes optics for application of incident radiation at and detection of output radiation from a detection zone along the separation channel, for the detection of radiation emitted by sample analytes (e.g., radiation induced fluorescence emission). In one aspect of the disclosed invention, the direction of incident radiation (e.g., from a laser or LED source), the axis of the separation channel at the detection zone, and the direction of collection of the output radiation are all substantially in the same plane. In one embodiment, the incident radiation is provided to the detection zone and/or the output radiation is collected from the detection zone, using light guides in the form of optical fibers. In an embodiment, the detection configuration of the present invention has optical fibers positioned at opposite sides of the detection zone along the separation channel. The optical fibers may be positioned at less than 180 degrees (e.g., 40 to 160 degrees, such as 120 degrees) apart from each other for high detection sensitivity. In another aspect of the disclosed invention, the detection configuration of the present invention incorporates ball-end optical fibers to provide incident radiation and collection of output radiation. In a further aspect of the disclosed invention, the detection optics configuration of the present invention may be implemented in an improved bio-separation instrument, in particular a capillary electrophoresis instrument.

U.S. Pat. No. 8,778,155, commonly assigned to the assignee of the present invention, discloses a cartridge-based bio-separation system configured to utilize a pen shaped bio-separation cartridge that is easy to assemble and use with no moving parts and that has an integrated reagent (separation buffer) reservoir. The cartridge includes a body, defining an opening as a detection window for receiving external detection optics, at least one capillary column supported in the body, having a first end extending beyond a first end of the body, wherein the detection window exposes a section along the capillary column, to which the external optics are aligned through the detection window, and a reservoir attached to a second end of the body in fluid flow communication with a second end of the capillary column. The reservoir is structured to be coupled to an air pressure pump or N2 tank that pressurizes the gel reservoir to purge and fill the capillaries with buffer/gel as the separation support medium.

U.S. patent application Ser. No. 14/720,723, published as US20150338347A1, commonly assigned to the assignee of the present invention, discloses a method for glycan profiling by capillary electrophoresis (CE), and a CE system for glycan analysis (N-Glycan). The CE system uses integrated dual optical fibers for both radiation excitation and emission detection. The CE system is configured for performing a two-color detection for data analysis. A single radiation excitation source is used to excite two emission fluorophores or dyes in the sample solution to be analyzed. One emission dye is to tag the sample and the other dye is used to provide a reference marker (e.g., a Dextran Ladder) for the sample run. Two detectors (e.g., photomultiplier tubes (PMTs)) are applied to simultaneously detect the fluorescent emissions from the dyes. The data collected by both detectors are correlated (e.g., synchronized, and/or super-positioned for analysis) for accurate data peak identification.

Based on the above disclosed detection technology, there is a need for a multi-channel capillary electrophoresis system that is simple and less expensive to operate (i.e. low cost per sample run), providing rapid analysis with high efficiency, sensitivity and throughput.

SUMMARY OF THE INVENTION

The present invention provides a simplified, low cost, high efficiency, highly sensitive, high throughput, multi-channel bio-separation system (e.g., capillary electrophoresis system). The bio-separation system includes an instrument that includes optics for application of incident radiation at and detection of output radiation from a detection zone along each separation channel, for the detection of radiation emitted by sample analytes (e.g., radiation induced fluorescence emission), without requiring fine alignment of the optics to each separation column (e.g., a capillary tube or column). The instrument is configured to conduct bio-separation in the separation channels of the bio-separation cartridge in an automated manner.

In one aspect of the present invention, is directed to a multi-channel cartridge-based bio-separation system configured to utilize a reliable, compact, simplified, removable, portable, interchangeable, reusable, low cost, recyclable and/or disposable bio-separation cartridge that is easy to assemble and use with no moving parts and that has an individual, separate, integrated reagent (i.e., a separation buffer) reservoir dedicated for each separation channel. The bio-separation cartridge includes multiple separation channels defined therein. The multiple channels may have different characteristics, such as different separation medium of different chemistries, different separation length, different channel sizes and internal coatings.

In one embodiment, the overall size of the cartridge is characterized by the separation channel having an effective separation length (i.e., the length of the capillary along which bio-separation is expected to take place between the cathode and the detection zone, which would be shorter than the actual length of the capillary column) of no longer than 50 cm, preferably in the range of 11 to 15 cm. In one embodiment, the bio-separation system includes an instrument that is provided with a detection configuration that includes optics for application of incident radiation at and detection of output radiations at multiple wavelengths/colors from a detection zone along each separation channel, for the detection of radiations emitted by sample analytes (e.g., radiation induced fluorescence emission) without requiring fine alignment of optics to the capillary column. The instrument is configured to conduct bio-separation in each separation channel of the bio-separation cartridge in an automated manner. Each separation channel may be controlled to effect bio-separation under different parameters (e.g., different applied voltages, different incident wavelengths, different run times, etc.).

In one embodiment, a capillary column that is supported by and within the cartridge defines each separation channel. In one embodiment of the present invention, the bio-separation system is for capillary electrophoresis separation and analysis, and the instrument therein is structured to utilize the capillary cartridge to conduct capillary electrophoresis separation, detection and analysis in an automated manner. In one embodiment, the capillary column is defined by a capillary tube for each channel, having a particular length, size (internal diameter), and internal coating.

In another aspect of the present invention, the chemistry of the medium and the characteristics of the separation column (e.g., for separation channels defined by capillary tubes, the capillary size I.D., internal coating and length) are defined for each channel in the cartridge. Different cartridges can be easily interchanged for use in the bio-separation system to suit the particular sample based separations. The buffer reservoir of each channel is structured to be coupled to an air pressure pump or N2 gas, that pressurizes the reservoir to purge and fill the associated separation channel with buffer (e.g., a gel) as the separation support medium. The cartridge does not require detection optics to be integrated into the cartridge, and the separation channel does not require fine alignment with respect to the detection zones. In one embodiment, the cartridge does not include integrated detection optics.

In one embodiment, not all channels need to be operative. One or more of the channels in the cartridge may be "dummy channels" that are not operative (e.g., not provided with a capillary tube).

In one embodiment, a capillary tube may be routed between the reservoir/electrode (anode) of one channel to an electrode (cathode) in another channel, thus allowing a longer length of capillary tube to be used to define a longer separation channel to improve resolution.

In one embodiment, the cartridge is provided with a RFID to identify the configuration of the cartridge, such as the number of operative channels, the chemistry in each of the channels, and the characteristics of the separation column (e.g., capillary tube) in each channel. The cartridge may be used for multiple runs without the need to replace the cartridge or refurbish the cartridge with fresh separation medium for reuse. The RFID may be configured to track the number of runs completed, to determine the end-of-life of the cartridge. The spent cartridge may be disposed or refurbished by replacing the separation medium and other parts (e.g., capillary tubes and seals).

BRIEF DESCRIPTION OF THE DRAWINGS

For a fuller understanding of the nature and advantages of the invention, as well as the preferred mode of use, reference should be made to the following detailed description read in conjunction with the accompanying drawings. In the following drawings, like reference numerals designate like or similar parts throughout the drawings.

FIG. 2A illustrates the external view of a capillary electrophoresis (CE) instrument, FIGS. 2B and 2C are sectional views showing internal components.

FIGS. 3A to 3H illustrate various views of a multi-channel cartridge, in accordance with one embodiment of the present invention.

FIGS. 4B and 4C are sectional views of the cartridge.

FIGS. 5A to 5C are various views of the front cover of the cartridge, in accordance with one embodiment of the present invention.

FIGS. 6A and 6B are various views of the rear cover of the cartridge, in accordance with one embodiment of the present invention.

FIGS. 7A to 7C are various views of the reservoir of the cartridge, in accordance with one embodiment of the present invention.

FIGS. 10A to 10D are various views of the fork assembly, in accordance with one embodiment of the present invention.

DETAILED DESCRIPTION OF THE PREFERRED EMBODIMENTS

Figure 1A:
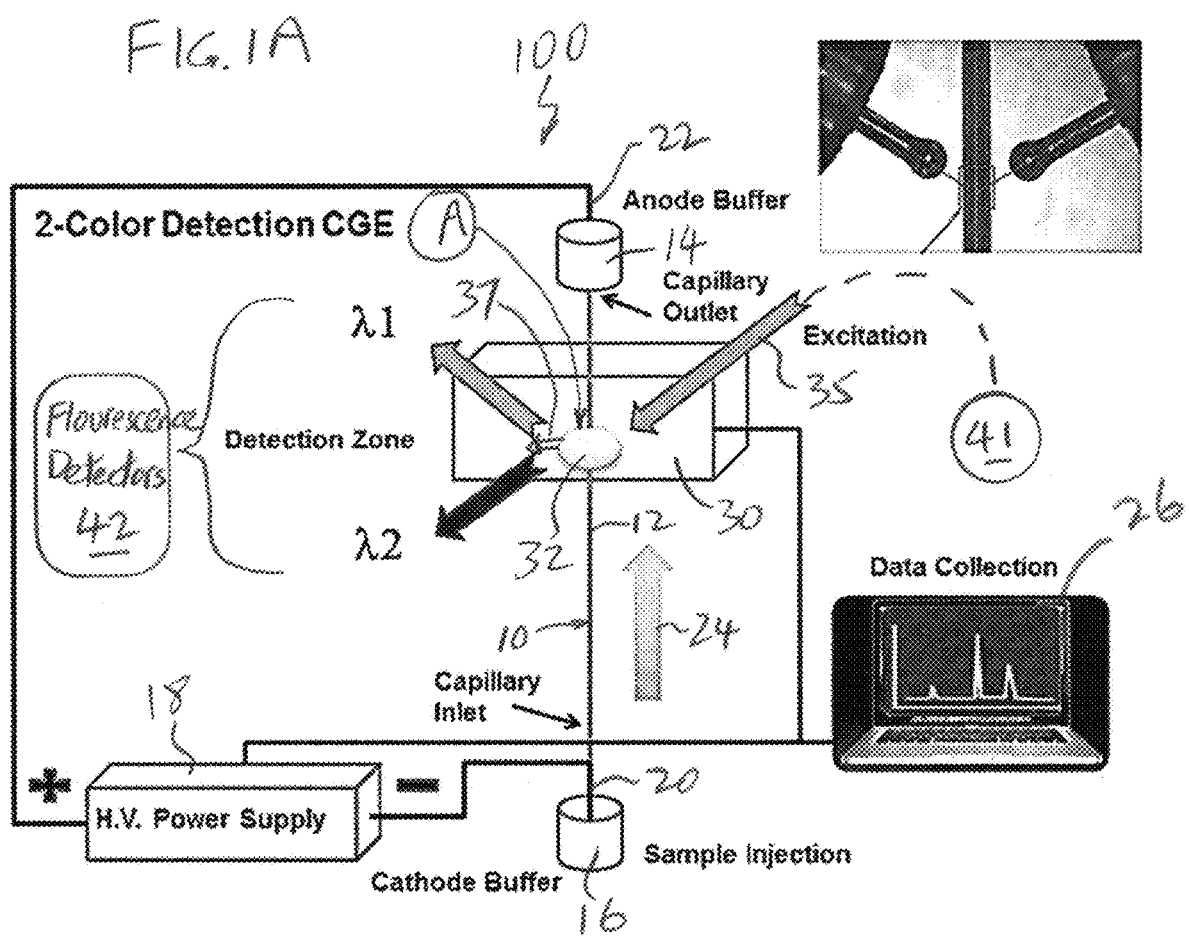
FIG. 1A is a schematic view of a capillary electrophoresis system that incorporates a multi-color detection configuration and cartridge in accordance with one embodiment of the present invention.

This invention is described below in reference to various embodiments with reference to the figures. While this invention is described in terms of the best mode for achieving this invention's objectives, it will be appreciated by those skilled in the art that variations may be accomplished in view of these teachings without deviating from the spirit or scope of the invention.

The present invention provides a high-throughput capillary gel-electrophoresis (4-channel) system for highly efficient, high speed, high throughput, biomolecules analysis. The 4-Channel CGE Analyzer (Qsep400) is a newly developed product that will significantly increase the pace at which DNA research is performed in the lab, saving hours of preparation time and assuring accurate, consistent and economical results. In one aspect of the present invention, a multi-channel high-performance capillary gel electrophoresis analyzer system has been optimized for DNA/RNA/Glycoprotein applications. The system uses integrated dual fiber optic fluorescence detection technology (Excitation and Emission detection) and a novel 4-Channel disposable gel-cartridge. The system can hold a total of 96 samples, which can be automatically analyzed within 1-2 hours. This high-throughput CGE system with Multi-Color fiber optic based fluorescence detection can be used in laboratories for high speed genotyping applications.

Reference is made to the bioanalytical system including detection system disclosed in U.S. Pat. Nos. 8,778,155 and 8,784,626, and U.S. Patent Application Publication No. US20150338347A1, the entirety of which are incorporated by reference as if fully set forth herein. These patents and patent applications are commonly assigned to BiOptic, Inc., the applicant and assignee of the present invention. In particular, these patents disclosed a simplified, low cost, high efficiency, highly sensitive, high throughput bio-separation system (e.g., capillary electrophoresis (CE) system). The bio-separation system includes an instrument that is configured to work with a single channel capillary cartridge, and that is provided with a detection configuration that includes optics for application of incident radiation at and detection of output radiation from a detection zone along the separation channel, for the detection of radiation emitted by sample analytes (e.g., radiation induced fluorescence emission), without requiring fine alignment of the optics to the separation column. The instrument is configured to conduct bio-separation in the separation channel of the bio-separation cartridge in an automated manner. The CE system has a less complex optical detection mechanism to reduce costs, which complements simplicity in operation, rapid analysis with high efficiency, sensitivity and throughput. US20150338347A1 further discloses fluorescence detection at two colors. The present invention adopts and modifies these systems to include improvements to the system (namely, a multi-channel cartridge having individual, separate reservoirs) in accordance with the disclosure hereinbelow.

For purpose of illustrating the principles of the present invention and not limitation, the present invention is described by reference to embodiments directed to capillary electrophoresis using a capillary separation column. Further, the present invention will be described, without limitation, in connection with radiation induced fluorescence detection (e.g., using a laser or LED source). Fluorescence is a spectrophotometric method of analysis where the molecules of the analytes are excited by irradiation at a certain wavelength and emit radiation at a different wavelength. The emission spectrum provides information for both qualitative and quantitative analysis. Generally, the advantage of fluorescence detection over absorbance detection is the superior detectability (detection sensitivity). For efficient fluorophores, single molecule detection in small volumes has been demonstrated. This is in part because fluorescence signal is measured against a relatively dark background, as a result of the emitted radiation being detected at a wavelength that is different from the wavelength of the incident radiation (e.g., the wavelength of the emitted fluorescence is at longer wavelengths than the excitation radiation).

System Overview

Miniaturization and automation of analytical instrumentation has many advantages over conventional labor intensive techniques (i.e. manual Slab-gel Electrophoresis). These advantages include improved data precision and reproducibility, short analysis times, minimal sample consumption, improved automation and integration of complex workflows.

Referring to FIG. 1A, a capillary electrophoresis (CE) system 100 incorporates the detection configuration as schematically illustrated. The CE system 100 generally comprises a capillary separation column 10 (e.g., 200-500 µm O.D.), which defines internal separation channels 12 (e.g., 25-200 µm I.D.), which may be capillary columns 10 (only one separation channel/capillary column is illustrated for simplicity). The capillary column 10 may be made of fused silica, glass, polyimide, or other ceramic/glassy materials. The inside walls of the separation column 10 (i.e., the walls defining the separation channel 12) may be coated with a material that can build up an electrostatic charge to facilitate electrophoresis and/or electrokinetic migration of the sample components. The separation channel 12 may be filled with a separation support medium, which may be simply a running buffer, or a sieving gel matrix (of a linear or non-linear polymeric composition) known in the art.

One end of the capillary column 10 is coupled to a reservoir 14 of running buffer. The other end of the capillary column 10 is coupled to another reservoir 16, which may alternately contain a sample (to be injected into the separation channel 12) and running buffer (after sample injection, to undertake separation). A power supply 18 supplies a high voltage to the reservoirs 14 and 16 via electrodes 20 and 22.

The mechanism of electrophoresis and radiation induced fluorescence when considered alone are outside the scope of the present invention. For the sake of completeness, it is sufficient to briefly mention the operation of the CE system 100. In operation, a prepared biological sample, tagged with at least one known fluorophore, is introduced into the far end of the capillary column away from the detection zone, by any of a number of ways that is not part of the present invention (e.g., electrokinetic injection from a sample reservoir or physical pressure injection using a syringe pump). When a DC potential (e.g., 1-30 KV) is applied by the power supply 18 to the electrodes 20 and 22, the sample migrates under the applied electric potential along the separation channel 12 in the direction 24 (e.g., sample that is negatively charged travels toward the positive electrode 22 as shown in FIG. 1) and separates into bands of sample components. The extent of separation and distance moved along the separation channel 12 depends on a number of factors, such as migration mobility of the sample components, the mass and size or length of the sample components, and the separation support medium. The driving forces in the separation channel 12 for the separation of samples could be electrophoretic, pressure, or electro-osmotic flow (EOF) means.

When the sample reaches the detection zone 32, excitation radiation is directed via the excitation fiber 34 in a direction 35 at the detection zone 32. The sample components would fluoresce with intensities proportional to the concentrations of the respective sample components (proportional to the amount of fluorescent tag material). The detector 42 detects the intensities of the emitted fluorescence via the emission fiber 36 in a direction 37, at one or more wavelengths different from that of the incident radiation. The detected emitted radiation may be analyzed by a multi-color (e.g., two-color) detection scheme (further discussed in reference to FIG. 11 below). For an automated system, a controller 26 (e.g., in the form of an external notebook computer or a desktop computer, or a computing unit integrated on-board the instrument) having a processor, controls the operations of the various components in the CE system 100 to effect capillary electrophoresis separation and data collection, and controls of other functions discussed herein below. The specific implementation of such control is well within the knowledge of one skilled in the art given the disclosure herein.

Detection Configuration

Figure 1B:
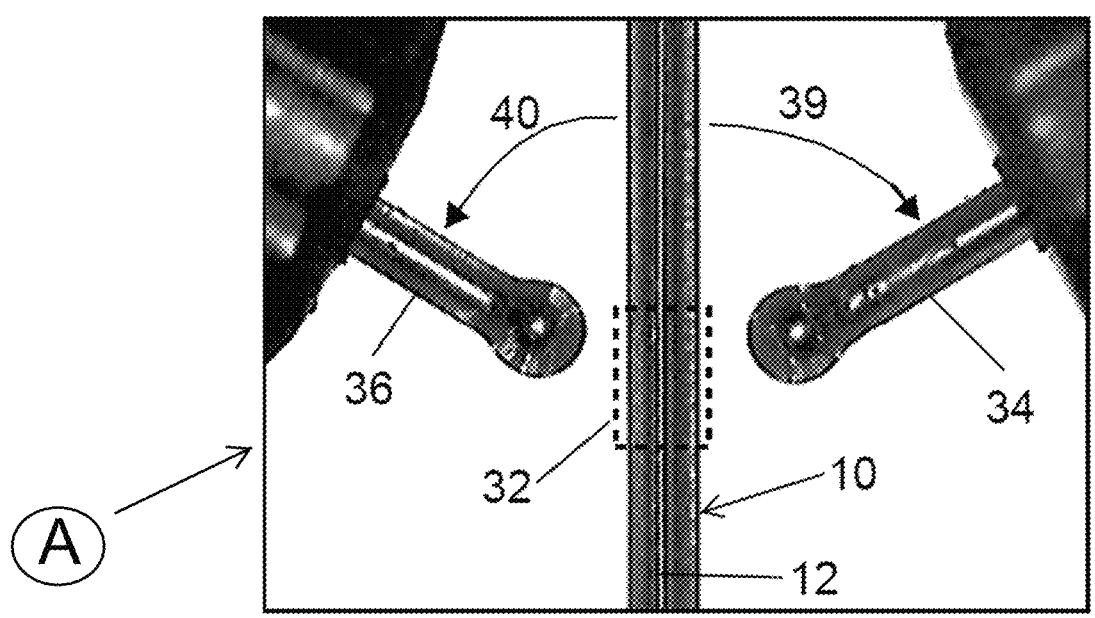
FIG. 1B illustrates the region A in FIG. 1A, including the detection region, and schematically showing the configuration of the excitation fiber, emission fiber and the capillary column.

In the particular illustrated embodiment in FIG. 1A, the detection optics configuration (schematically indicated in the area 30 located about a detection window/zone 32) corresponds to the embodiment illustrated in FIG. 1B (region A in FIG. 1A). The direction 35 of incident radiation (e.g., from a laser or LED source), the axis of the separation channel at the detection zone, and the direction 37 of collection of the output radiation are all substantially in the same plane. In the illustrated embodiment, the detection configuration of the present invention has optical fibers positioned at opposite sides of the detection zone separation channel. In one embodiment, the incident radiation is provided to the detection zone and/or the output radiation is collected from the detection zone, using light guides in the form of optical fibers, in particular ball-ended optical fibers (i.e., optical fibers terminating in a micro ball that is integral to the fiber end in a unitary structure).

Referring also to FIG. 1B, a ball-ended fiber (the excitation fiber 34) extends from a radiation source (e.g., LED or laser source 41, schematically shown in FIG. 1A) to direct excitation radiation in a direction 35 at the detection zone 32. The ball end of the excitation fiber 34 is positioned at or proximate to the exterior surface of the separation column 10 about the detection zone 32. In the illustrated embodiment, the ball end of the excitation fiber 34 is positioned at a distance spaced from the exterior surface of the separation column 10 (i.e., non-contact mode). In this illustrated embodiment, another ball-ended fiber (the emission fiber 36) extends to a detector (e.g., a fluorescence detector 42, schematically shown in FIG. 1) to collect emitted radiation at a direction 37 from the detection zone 32. The ball end of the emission fiber 36 is positioned at or approximate to the exterior surface of the separation column 10 about the detection zone 32. In the illustrated embodiment, the ball end of the emission fiber 36 is positioned at a distance spaced (in a non-contact mode) from the exterior surface of the separation column 10. Both excitation and emission fibers 34 and 36 with ball tips are positioned at opposite sides of the separation column 10 in a non-contact mode (spaced from the exterior of the capillary column) to reduce background fluorescence and not cause any physical damage to either capillary column or the micro-ball.

In the illustrated embodiment in FIG. 1B, the components at the detection zone 32 as shown lie in substantially the same plane. Specifically, the longitudinal axis of the excitation fiber 34, the longitudinal axis of the emission fiber 36 and the longitudinal axis of the capillary channel 12, are substantially aligned in the same plane (i.e., substantially coplanar), at least at the region of the detection zone 32. That is, while the lengths of the excitation fiber 34, the emission fiber 36 and the capillary column 10 may be bent overall, however at least near the detection zone region, the axis of the excitation fiber 34, the axis of the emission fiber 36 and the axis of the capillary channel 12 are substantially aligned in the same plane, such that the direction 35 of incident radiation from the excitation fiber 34 towards the detection zone 32, the axis of the separation channel 12 at the detection zone 32, and the direction 37 of collection of the output radiation away from the detection zone along the emission fiber 36 are all substantially in the same plane.

Further, at the detection zone 32, the angle between the axis of the excitation fiber 34 and the axis of the emission fiber 36 are not aligned in a straight line. At least one of the axis of the excitation fiber 34 and the axis of the emission fiber 36 is not perpendicular to the axis of the separation channel 12 at the detection zone 32. In the illustrated embodiment shown in FIG. 2, both the axis of the excitation fiber 34 and the axis of the emission fiber 36 are not perpendicular to the axis of the separation channel, and are at angles 39 and 40, respectively, to the axis of the separation channel 12 at the detection zone 32. The angle 39 and the angle 40 may be substantially the same or different, and may be less than or greater than 90 degrees measured with respect to a reference direction of the axis of the separation channel 12 or a reference section of the capillary column 10 (e.g., the section of capillary column 10 between the fibers 34 and 36 as shown in FIG. 1B). For example, the angle 39 may be less than 90 degrees and the angle 40 may be greater than 90 degrees, measured from the same reference section. In the illustrated embodiment in FIG. 1B, the angles 39 and 40 are same and substantially in the same plane.

In the embodiment illustrated in FIG. 1B, both the excitation fiber 34 and the emission fiber 36 each has a 200 micron diameter core as light guide within an external cladding, and a 350 micron diameter ball shaped tip (i.e., the ratio of the fiber core diameter to the ball diameter is 1:1.75), which comprises fused the core and cladding material. The ball shaped tip has a substantially spherical profile. The ball-end fibers may be formed by using a fusion splicer, or are available from a number of available suppliers. The capillary column 10 has an outside diameter of 200 to 370 micron (e.g., 360 micron) and an internal diameter of 20 to 150 micron (e.g., 75 micron). The tip of the ball end of the excitation fiber 34 is spaced at approximately 50-500 micron from the external surface of the capillary column, and the tip of the ball end of the emission fiber 36 is spaced at approximately 10 to 500 microns (e.g., 50-200 micron) from the external surface of the capillary column. Alternatively, the emission fiber 36 may have a 300 micron diameter core with a 500 micron diameter ball shaped tip at its distal end (i.e., the ratio of the fiber core diameter to the ball diameter is 1:2.5). The angles 39 and 40 each may range from greater than 0 to less than 90 degrees, preferably between 20 to 70 degrees, and more preferably at 30 to 45 degrees. In the illustrated embodiment of FIG. 1B, both angles 39 and 40 are about 70 degrees. The ball ends of the fibers 34 and 36 are not touching the capillary column 10.

In one embodiment, the optical detection system is structured with a super-bright UV LED (e.g., LG Innotek/IR-Tronix or Dowa) as excitation radiation source for the fluorescent labeled (FITC) antibody fragment detection. The modular design and fiber optic coupling provides flexibility for exchanging the excitation radiation to a laser module (for LIF applications) or other type of inexpensive light sources.

It has been found that compared with flat-end fibers (bare fiber, with no micro ball lens), the ball-ended fibers provide good focusing of incident radiation (light concentration/power density) for the excitation fiber 34 and high collection efficiency (high Numerical Aperture; NA) for the emission fiber 36 as a high angle fluorescence collector for increased fluorescence signal collection capability and improved detection sensitivity. Using large core (e.g., 100-1000 micron) and high NA (0.15-0.5) multi-mode fibers, it allows high power light coupling from LED or laser into the excitation fiber 34. By producing an integrated micro ball lens at the distal output end of the excitation fiber 34, it allows good coupling efficiency inside the separation channel 12 (e.g., 20-200 micron micro-fluidic channel) for high fluorescence detection sensitivity.

A smaller diameter excitation fiber 34 having 200 micron core diameter with a 330-350 micron diameter ball (see FIG. 1B) directed at the capillary separation channel 12 results in a smaller focal spot with higher power density, thereby optimizing the fluorescence excitation signal. If an emission fiber 36 having a 300 micron core diameter and a 500 micron diameter ball lens is used for emission collection, the emission collection efficiency is increased. The outside diameter of the capillary column is 360 micron, and the inside diameter is 75 micron.

The 2-fiber detection configuration with ball-end fibers has been applied to a disposable single-channel, single capillary cartridge concept with an integrated buffer reservoir (see, U.S. Pat. Nos. 8,778,155 and 8,784,626, and U.S. Patent Application Publication No. US20150338347A1). The present invention provides a higher throughput instrument utilizing multiple gel-cartridges of similar design to speed up the separation time (cycle) by a factor of 4×-8× (1 hour for full 96-well sample plate run).

The test samples are introduced to the separation capillary column 10 by electro kinetic injection. The high voltage power supply (e.g., EMCO, Sutter Creek, Calif.) is used to deliver, e.g., 500V to 20 KV of electrical field to the capillary for the electro kinetic injection and separations of bio-molecules in each channel. For each channel, an excitation LED having broad band light energy (e.g., FWHM=20-50 nm) and 20-100 degrees of viewing angle is coupled to the large core excitation fiber (e.g., 100-1000 micron) at the flat end (polished or cleaved end). A line filter (e.g., FWHM=2-50 nm Band Pass line filter) is placed in front of the LED before coupling the light into the 200 micron diameter core with 350 diameter micron ball-ended excitation fiber to reduce background noise. The micro-ball lens end of the fiber is produced by fusion splicing (high voltage heat melting) with a well controlled ball diameter to create a well defined exit NA and spot size for coupling the excitation radiation energy into the inner diameter (the separation channel) of the capillary column. For each channel, the fluorescence emission signal produced by the separated analytes are then collected at the detection zone of the capillary channel using a similar ball-ended fiber (larger core fiber with 500 micron diameter ball) and is relayed to an external detector module (e.g., fluorescence detector 42 schematically shown in FIG. 1), which may include one or more photomultiplier tubes (PMTs) or SiPMTs or CCDs, and may also include beam-splitters, built-in emission filters (e.g., Band Pass Filters) for multi-color detection, in accordance with further disclosure below.

Further details of the detection optics and detection scheme may be referenced to U.S. Pat. Nos. 8,778,155 and 8,784,626, and U.S. Patent Application Publication No. US20150338347A1, the entirety of which have been incorporated by reference as if fully set forth herein.

Figure 2D:
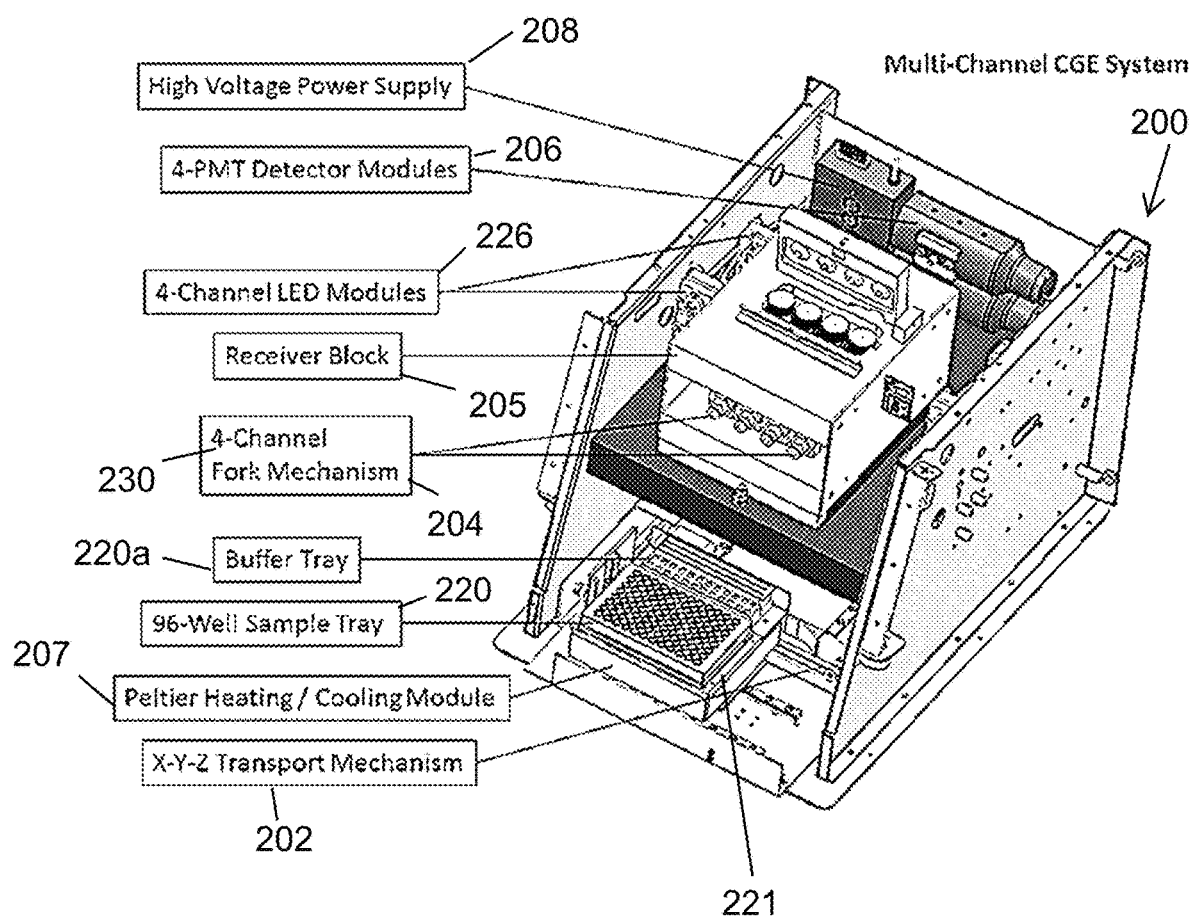
FIGS. 2D and 2E are internal views, in accordance with one embodiment of the present invention.
Figure 2E:
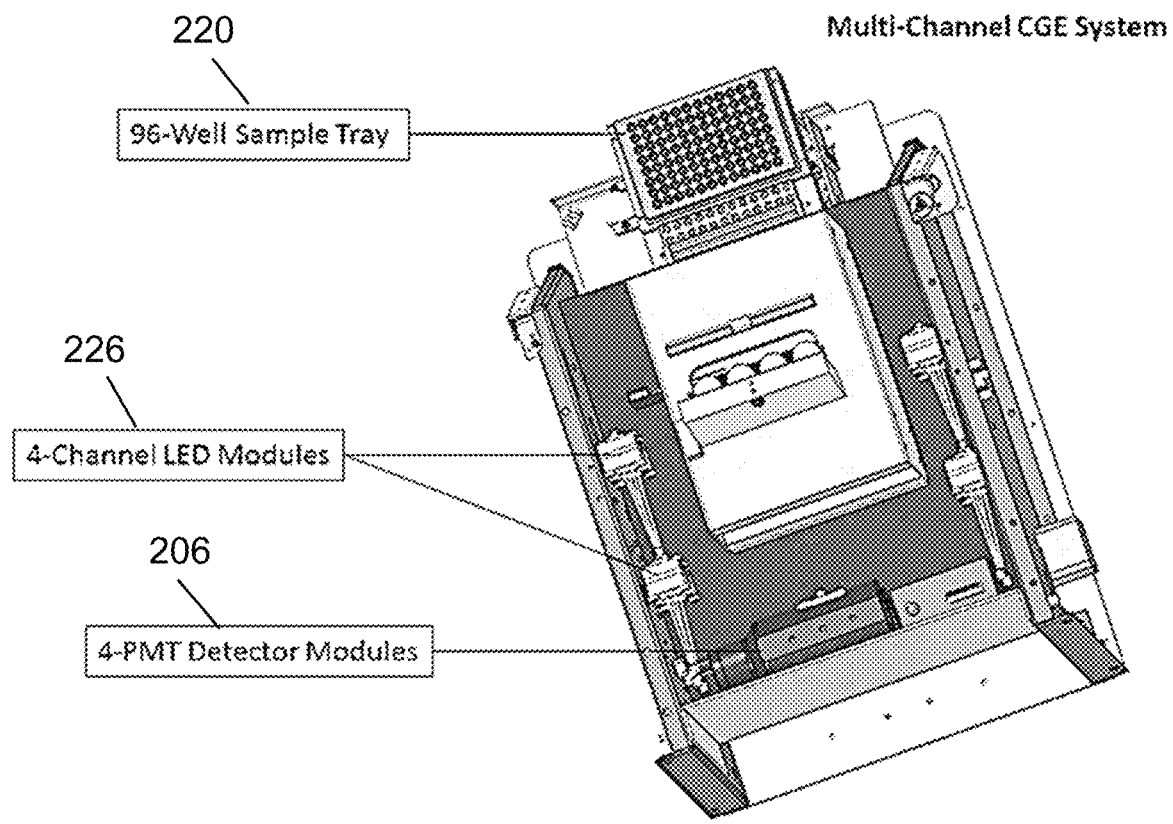
Figure 9A:
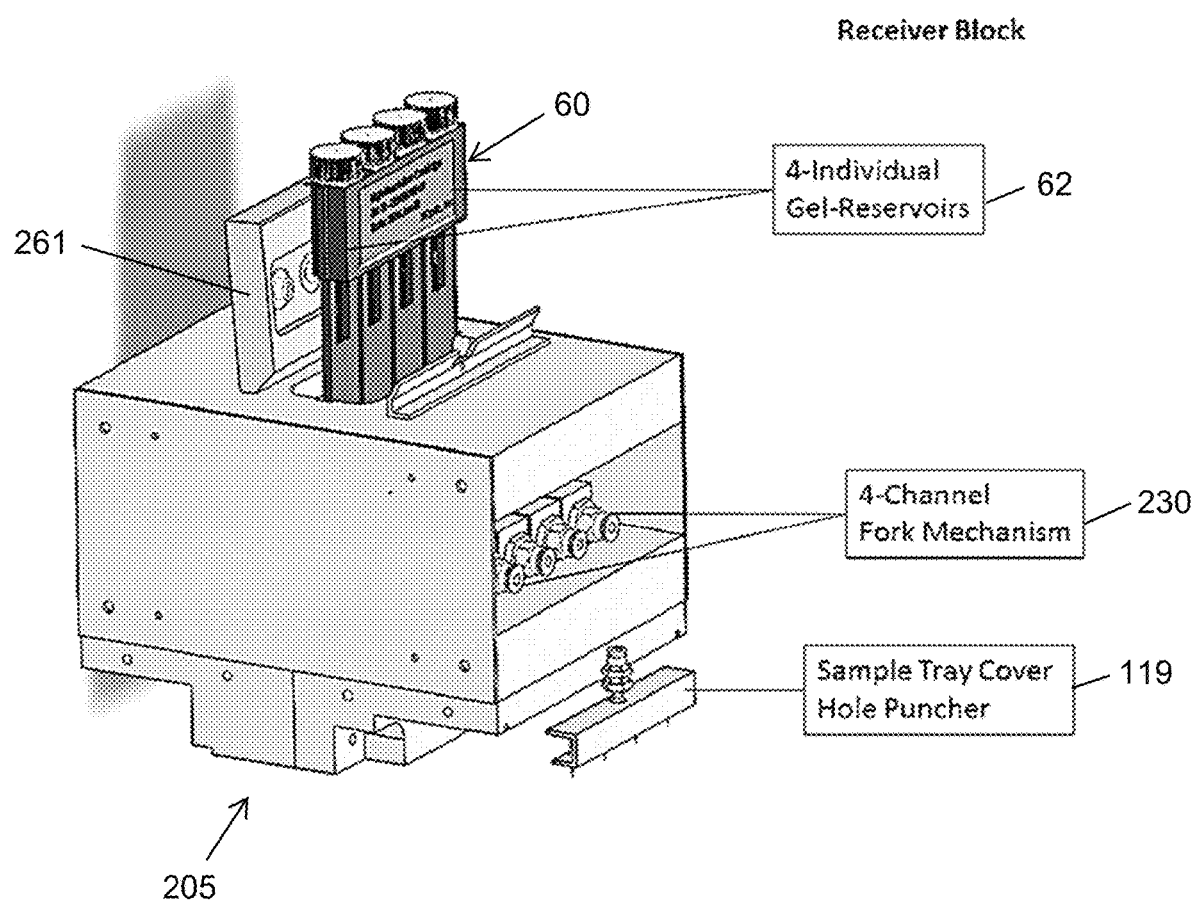
FIG. 9A shows the insertion of a cartridge into a receiver block in the instrument, and 9B shows additional heating/cooling module for the receiver block, in accordance with one embodiment of the present invention.
Figure 9B:
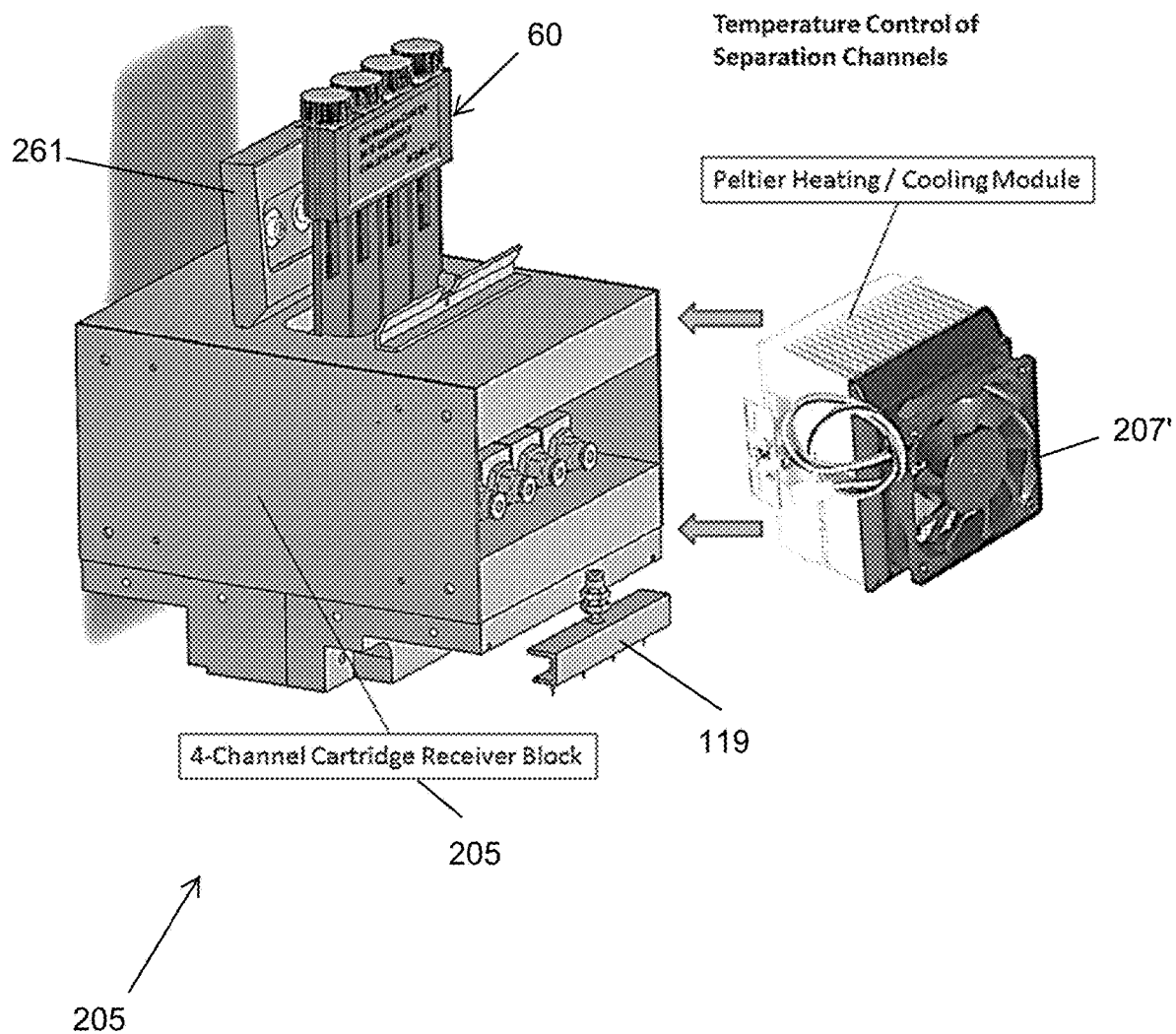
FIG. 9C shows a receiver block.
FIG. 9D is a sectional view showing the fork assembly in the interior of the receiver block, in accordance with one embodiment of the present invention.

The CE instrument may include a temperature control mechanism, such as a Peltier heating/cooling module 207 interfaced with (e.g., below) the table 221 (see, FIG. 2D), or an external Peltier heating/cooling module 207' as shown in FIG. 9B. Temperature control allows for both PCR Amplification and Electrophoresis/Detection in one instrument, CE Instrument FIG. 2A illustrates the external view of a CE instrument 200 that is comprised in the CE system 100. The CE instrument 200 incorporates some of the components of the CE system 100 discussed above within the instrument, in accordance with one embodiment of the present invention (some of the components of the CE system may be external, e.g., a power supply, a pressurized gas source, a computing unit, etc.). The CE instrument 200 includes components including the detection configuration schematically shown in FIG. 1A. FIGS. 2B and 2C are sectional views that illustrate the internal views of the CE instrument 200, in accordance with one embodiment of the present invention. The CE instrument 200 includes various components, including a receiver block 205 for receiving a cartridge 60 in accordance with the present invention. The receiver block supports a cartridge interface mechanism 204, which comprises multiple fork assemblies that support the detection optics discussed above and that interface/engage the detection optics to the capillary columns in the cartridge. FIGS. 2D and 2E are schematic views further illustrating the components of the CE instrument 200 which reside within the instrument housing. The CE instrument 200 comprises a system board 201, operatively coupled to a sample transport mechanism 202 (e.g., a three-axis X-Y-Z transport mechanism), a cartridge interface mechanism 204, an optical signal detector such as comprising photomultiplier (PMT) modules 206, a high voltage power supply 208 (which may alternatively reside outside of the CE instrument 200), detection optics (e.g., as shown in FIG. 1B), and a pressurized gas source (which may reside outside the CE instrument 200, but connected to a port in the instrument housing).

A controller 26 is provided for user interface and programming of experiment/test settings and parameters. The controller includes the necessary application software routines, which may also include data reduction applications. The controller 26 may be an integral part of the instrument 200 (e.g., as part of the system board 201, with application routines coded in ASICs), or it may be a separate unit coupled/interfaced to the CE instrument 200. In the illustrated embodiment, the controller is external to the housing of the CE instrument 200, in the form of a desktop computer or notebook computer, which is coupled to the CE instrument 200 via the system board 201 via a USB interface. The external controller 26 may include mass storage devices, display, keyboard, etc., or some of these user interface components may be configured integral to the CE instrument (e.g., a display and a keyboard on the front housing). Alternatively, the system board 201 may be incorporated as part of the external controller 26, without departing from the scope and spirit of the present invention.

The system board 201 includes the necessary electronics to drive the various components in the CE instrument, e.g., the movements of the transport mechanism 202, the output of the power supply 208, the PMT modules 206, the valve release of the pressurized gas, the movements of the cartridge interface 204, an RFID transmitter/reader, etc. It is noted that the system board 201 is schematically represented in the figures. It may include other electronic boards for controlling specific components (e.g., electronic board for controlling motors in the sample transport mechanism 202), or these other boards may be separate from and in communication with the system board 201 to perform the intended function. The exact electronic board configuration is not critical to the present invention, and it is well within the knowledge of one skill in the art to configure the boards to achieve the desired functions and features disclosed herein. The controller 26 and/or the system board 201 may be built into a front panel 203 of the instrument housing to allow user access to place and remove a sample and/or reagent tray 220. The front panel 203 includes a touch screen user interface panel 25. The touch screen panel 25 can thus be used as a control panel for setting operation of the instrument 200. As illustrated, the front panel 203 can be driven by stepper motors to slide up to provide access to place/remove a tray 220 (e.g., supporting buffer solutions, reagents and/or samples) on/from the transport mechanism 202, and to slide down to prevent access.

As illustrated in FIG. 2D, the sample transport mechanism 202 includes a table 221 supporting the tray 220 having multiple wells (e.g., a standard 96-well titer plate), and a tray 220a having larger wells for a buffer, cleaning solutions and waste collection, to move with three degrees of freedom. The multiple wells may include wells containing cleaning solutions and samples and also for waste collection. It is noted that in the figures, X, Y and Z are orthogonal axes. Y is the vertical axis; X is in a horizontal direction across the instrument (parallel to the rear of the instrument); and Z is in a horizontal direction into and out of the instrument. The table 221 is controlled by the transport mechanism 202 to move up and down, and to move within a plane in a straight line and rotate within the plane. That is, the table 221 moves in a single horizontal direction (Z-direction), and in a vertical (Y-direction), and rotation about the vertical axis (Y-axis). The combination of rotation and translation motions would be able to place any of the multiple wells in the tray 220 and tray 220a for access by the tip of the depending capillary column 60.

The pressurized gas source (e.g., pressurized air or N2) may be a gas cartridge installed within the housing of the CE instrument, or may be an external source (e.g., air-pump) providing pressurized gas to the CE instrument via a gas connection port at the instrument housing (in which case, the pressurized gas source would be the gas connection port to the external gas source). The pressured gas is fed to the reservoir 62 in the cartridge 60 via appropriate gas tubing and valves (which is operatively coupled to the system board 201).

The power supply 208 includes a system DC power supply (e.g., 12-24 VDC from external AC power) coupled to the system board 201, and a variable high voltage power supply providing the necessary high voltage to electrode contacts/probes for electrical contact with electrodes 66 and 67 in the cartridge 60 for carrying out electrophoresis therein. Alternatively, instead of using an internal 12-24 VDC power supply with external AC power, the CE instrument 200 may use an external 12-24 VDC power supply, which makes the instrument simpler and safer to use without the internal AC to DC conversion. This would also allow for battery operation for field portability and operations. The contact probes may be actuated pneumatically (e.g., by regulating pressurized gas from the gas source, or electromechanically, to contact against the exposed surfaces of the electrodes 66 and 67, or the contact probes may be simply spring loaded to bias against the exposed surfaces of the electrodes 66 and 67. Further details of the contact probes may be referenced to U.S. Pat. Nos. 8,778,155 and 8,784,626, and U.S. Patent Application Publication No. US20150338347A1, the entirety of which have been incorporated by reference as if fully set forth herein.

The excitation fiber 34 is optically coupled to a light source in the form of a 4-channel LED modules 226, which may be part of the system board 201. The emission fiber 36 is optically coupled to the PMT modules 206 via appropriate optical filters. The electrical output of the PMT modules 206 is coupled to the system board 201.

Referring also to FIGS. 9A and 9B, the cartridge interface mechanism 204 is supported in the receiver block 205 of the instrument, and is configured to receive the cartridge 60, and support its location positively and accurately with respect to the detection optics. A cartridge-door 261 (FIGS. 2A to 2C) is provided at the top side of the instrument housing to allow insertion and removal of the cartridge 60.

As shown in FIGS. 9A to 9C, a hole puncher 119 is provided to facilitate punching a seal that may have been provided on a tray 220 to prevent evaporation and/or contamination. The hole puncher 119 may be configured to be actuated pneumatically or electromechanically for vertically up/down and/or lateral movements.

Multi-Channel CE Cartridge

In one aspect of the present invention, the system 100 is a multi-channel cartridge-based bio-separation system that comprises a CE instrument 200 (e.g., shown in FIGS. 2A to 2E) that is configured to utilize a reliable, compact, simplified, removable, portable, interchangeable, reusable, low cost, recyclable and/or disposable bio-separation cartridge that is easy to assemble and use with no moving parts and that has a separate integrated reagent (separation buffer) reservoir for each channel. Each of the multi-channel bio-separation cartridge could be structured to have an overall size and slender shape generally conforming to the general shape of a pen. The bio-separation system 100 is provided with the above-described detection configuration that includes optics for application of incident radiation at and detection of output radiation from a detection zone along each of the separation channels, for the detection of radiation emitted by sample analytes (e.g., radiation induced fluorescence emission) without requiring fine alignment of optics to the capillary column. The system 100 is configured to conduct bio-separation in each of the separation channel of the multi-channel bio-separation cartridge in an automated manner.

In the disclosed embodiments, the present invention provides reusable 4-channel gel-cartridge, which permits easy plug-and-play use in a robust injection molded body with integrated 4-independent gel-reservoir design that incorporates 4-micro-fluidic glass capillary (20-100 μm ID) with an effective separation length of, e.g., 11 cm. The shortened capillary length allows for reduced operating voltages (1-15 KV) and the elimination of expensive cooling systems such as Peltier or recirculating chillers. The design includes top and bottom electrodes (Anode & Cathode), an exposed detection zone and an imbedded RFID chip/label to provide ID for the gel-cartridge type and track the number of runs per cartridge. Each cartridge contains linear gel-matrix and is capable of analyzing 200 samples in as few as 2 minutes per sample, consuming as little as 1 pl from the 1 μl-20 μl sample volume.

The present gel-cartridge is a simple yet very robust design approach for large volume type manufacturing for an easy to operate CGE instrument that provides significant background noise reduction, which results in improved S/N for high detection sensitivity of biomolecules at very low-cost per sample run. The 4-channel independent gel-reservoir design provides flexibility to use different gel-matrix (buffer) combinations for different separation resolutions. The individual channels could be assembled with different glass capillary inner diameters and lengths to improve the performance for different biomolecules (see, FIGS. 8A and 8B). Longer capillary tube could be looped from one reservoir to the next section of the cartridge for longer separation runs to improve resolution.

FIGS. 3A to 3H illustrate a multi-channel cartridge 60 in accordance with one embodiment of the present invention. As illustrated, the cartridge 60 includes four separate cartridge elements 60' each representing/corresponding to a single channel. Each cartridge element is blade shaped. More or less channels may be implemented without departing from the scope and spirit of the present invention (e.g., 2, 3, 6, 8, etc. channels). A capillary column 10 is supported by and within each cartridge element 60' channel of the cartridge 60. In the illustrated embodiment, each of the cartridge element 60' has a slender and generally longitudinal body 80. While the illustrated body 80 of the cartridge 60 is generally flat cylindrical or blade shaped, it may have other sectional cylindrical profile, such as round, square, rectangular, hexagonal, elliptical, or other regular and irregular profiles. As illustrated, the body 80 has a body section that has a generally uniform or constant width, with the bottom end of the body being narrower than the uniform width of the body section. The bottom end of the body 80 may be tapered to a narrower section, e.g., terminating in a generally conical portion 97. The capillary column 10 is held by or within the cartridge body 80 generally in line with the longitudinal central axis of the cartridge body 80. In one embodiment, the overall size of the cartridge is characterized by the separation channel being no longer than 30 cm, preferably in the range of 10-20 cm.

Referring also to FIGS. 4A to 4C, 5A to 5C, 6A to 6B and 7A to 7C, an outlet buffer reservoir 62 is attached to the top end of the body 80. The buffer reservoir 62 includes a cap 85 (e.g., screw-on or plug) that seals the top opening of the reservoir 62, to retain separation support medium (e.g., a gel buffer) therein. An additional plug cover 85' may be provided under the cap 85. The bottom of the reservoir 62 has a rim 88 defining a groove 93, and a center stub 90 having a through hole 91 for receiving the capillary column 10. The cap 85 of the reservoir 62 has a port 64 (e.g., a small drilled hole) that is for coupling to an external pressurized gas (e.g., nitrogen) supply (e.g., a gas tank or pump that is part of the CE instrument to be discussed below). (When the cartridge 60 is not used for a while, the port 64 can be sealed by applying a short strip of tape.) The pressurized gas provides the required air pressure to purge and fill the capillary separation channel 12 in the capillary column 10 with the separation support medium (buffer) contained in the reservoir 62. Depending on the viscosity of the separation buffer, pressures of up to 60 PSI can be applied to fill the capillary column 10 through the top buffer reservoir 62. The reservoir 62 is provided with an electrode 66 (anode), which provides electrical contact to the buffer. The electrode 66 has contact surface exposed to external through opening 63.

Referring also to FIGS. 5A to 5C and 6A to 6B that illustrate the internal structures, the body 80 includes two half covers or shells 82 and 83 that comprises complementary structures on facing interior surfaces (i.e., surfaces not exposed to external when the shells 82 and 83 are assembled), which may be generally mirror of each other. The half shells 82 and 83 define a through opening or window 86 for access to the detection zone 32 by external optics (as will be explained further in connection with the CE instrument discussed below.) The inside of the half shells 82 and 83 are generally hollow. The half shells 82 and 83 are each provided with a flange 92, which mates with the groove 93 on the reservoir 62 when the parts are assembled, to securely attached the reservoir 62 to the body 80 of the cartridge 60 in an open cavity at the top end of the cartridge body 80. Grooves and recesses (on tabs 101) are provided at appropriate locations along the inside of the half shells 82 and 83 to thread the capillary column 10. At the outside surface of the half shell 82 is an alignment slot 50 and indexing recesses 51 to provide guides to facilitate positive and accurate positioning and alignment of the detection window 86 in the cartridge 60 with respect to the CE instrument when the cartridge 60 is inserted into the CE instrument. Similarly, at the outside of the half shell 83, indexing recesses 52 are provided for alignment and positioning the detection window 86 within the CE instrument. Further, an alignment/indexing recess 53 are provided to facilitate alignment and positioning of the electrode 67 to the external power source provided in the CE instrument.

Figure 4A:
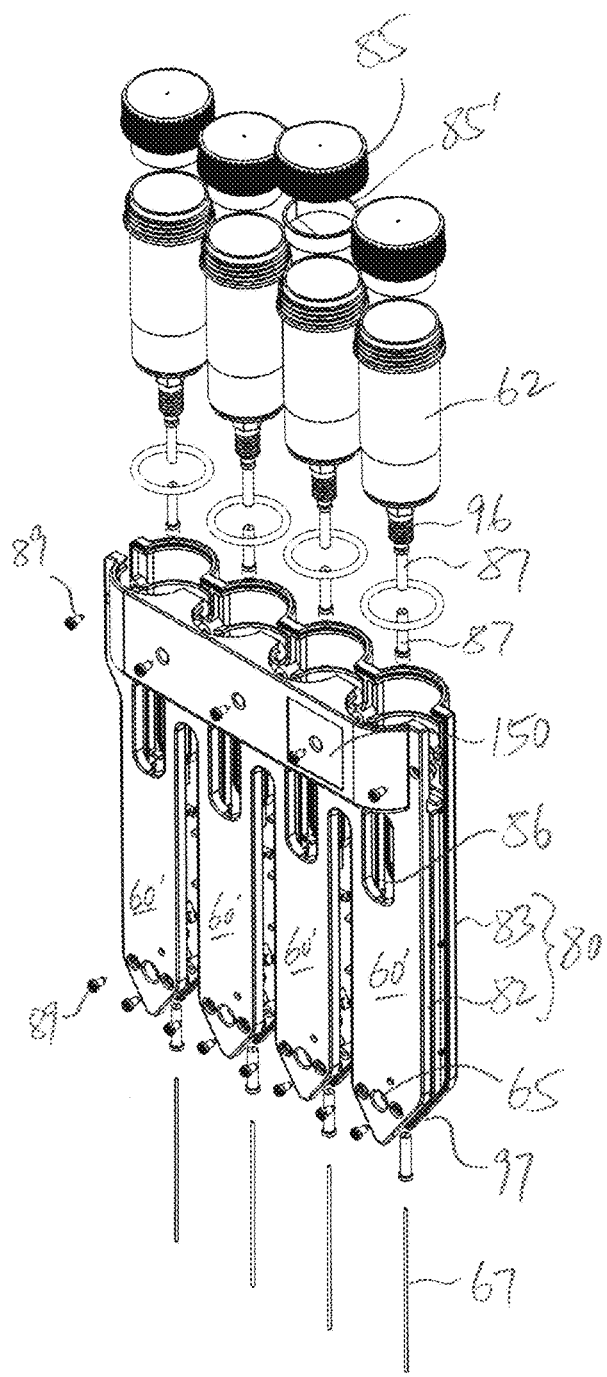
FIG. 4A is an exploded view of the cartridge.
Figure 4B:
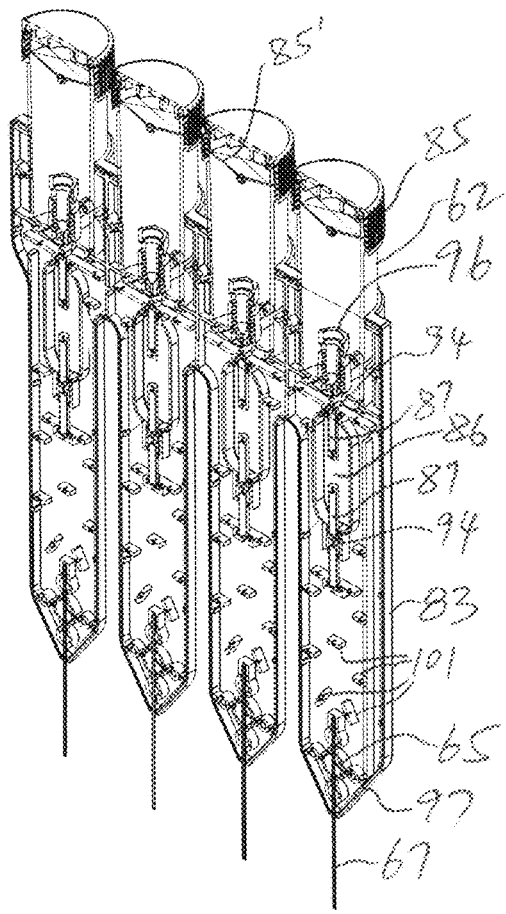

Referring also to FIG. 3H that is a sectional view of the two half shells attached together, cylindrical sleeves or ferrules 87 upstream and downstream of the detection zone 32 support the capillary column 10 within the body 80 of the cartridge 60 (see also FIG. 4). The capillary column 10 is threaded through the ferrules 87, and one end of the capillary column 10 extends into the reservoir 62 in fluid communication with the buffer contained in the reservoir 62, and the other end extends to depend beyond the lower end of the cartridge body 80. In the illustrated embodiment (see FIGS. 4B and 4C), to secure the upper end of the capillary column 10 in the reservoir 62, a threaded nipple 96 having a through-hole is threaded into the base of the reservoir 62 and compress against an O-ring seal 96' (see also FIG. 6C). The upper end of the capillary column 10 is inserted through the nipple 96. The threaded nipple 96 provides flexibility in removing the capillary column or accommodating capillary columns of different lengths. Alternatively, instead of using the nipple, the end of the capillary column 10 can be secured to the reservoir 62 by glue or epoxy. The ferrules 87 extend from the recesses 94 into the window 86, but expose the detection zone 32 of the capillary column 10. The two half shells 82 and 83 are assembled together to form the body 80, e.g., by screws 89, or epoxy, or clips.

The capillary column 10 is supported coaxially by the ferrules 87, which are supported in the cartridge body 80, wherein each of the ferrules 87 is cantilevered by the cartridge body and having an end extending into the detection window 86, and wherein the detection zone along the capillary column is exposed between the extended ends of the ferrules 87. At the lower end of the cartridge 60 is another electrode 67 (cathode). The electrode 67 has contact surface exposed to external through opening 65 at the conical portion 97 of the cartridge body 60 half shells 82 and 83, for coupling to an external high voltage power supply in the CE instrument for electrophoresis when installed inside a CE instrument, such as the embodiment described herein below (see, FIGS. 2A to 2E), which is designed to receive the cartridge 60. The lower electrode 67 is configured in the form of metal/conductive sleeve, extending from the lower end of the cartridge 60, and surrounding the side of the depending end of the capillary column 10 completely (e.g., in the form of a co-axial metal tube) or partially (e.g., in the form of a wire mesh, gauze or net, or an open channel having a C-shaped cross-section), with the tip of the capillary column 10 exposed for fluid communication with an external buffer reservoir. The tip of the capillary column 10 may extend beyond the end of the electrode 67, for better access to samples.

To assembly the various components shown, the bottom rim 88 of each reservoir 62 is placed at the end of the half shells 83, with the flange 92 inserted in the groove 93 on the reservoir 62. For each cartridge element 60', a capillary column 10 is threaded through the ferrules 87, and one end is threaded into the bottom electrode 67. The other end of the capillary column 10 is inserted into the bottom opening 91 on the reservoir 62, through the nipple 96. The nipple 96 is tightened onto the base of the reservoir 62, compressing the O-ring 96' to provide a seal against the body of the capillary column 10. The far ends of the ferrules 87 are inserted in recesses 94 on the half shell 83. The lower electrode 67 is positioned in the groove 95 provided on the inside the conical portion 97 of the half shell 83, with the end extending beyond the conical portion 97. A drop of glue may be provided to secure the electrode 67 in the groove 95. The other half shell 82 is placed over the half shell 83 and attached by suitable fasteners, such as rivets or screws 89 as shown. The reservoir 62 is filled with the desired separation support medium (buffer) and capped. The fully assembled cartridge 60 may be tested and labeled. An electronic label, such as an RFID label 150 may be imbedded or attached to the cartridge 60 (e.g., at the outside surface of the reservoir 62), to provide a means of identification of the particular configuration of the cartridge (e.g., buffer medium, capillary size, coating and length). The RFID label may also include the pre-set limit on the number of runs and type of cartridge with expiration date. After assembling the cartridge 60, the RFID label is provided with the initial configuration parameters. The RFID may be re-recordable and updated with information to track usage of the cartridge (e.g., the number of runs and the conditions and/or parameters of the runs (e.g., applied voltage, duration, sample), the number of time the cartridge has been reconditioned, etc.), so that the history of the cartridge can be easy determined (e.g., by the CE instrument discussed below or by a separate reader). The end of the useful life of each cartridge can also be determined from the RFID label. Alternatively, a static label, such as a bar code label may be provided.

As will be explained in greater detail below, in electrophoresis operation as installed in the CE instrument 200, the end of lower electrode 67 along with the open end of the capillary column 10 are dipped into an external buffer reservoir. To conduct electrophoresis, high voltage is supplied to the electrode 66 in the buffer reservoir 62 and the electrode 67 dipped in the external reservoir, to provide a high voltage circuit across the buffer to complete the electrophoresis path in the capillary column 10. The electrode 67 also provides protection to prevent breakage of the depending end of the capillary column 10.

The cartridge does not require detection optics to be integrated into the cartridge, and the separation channel does not require fine alignment with respect to the detection zones. Specifically, in the illustrated embodiment, the cartridge does not include integrated detection optics. In the detection window 86 surrounding the region of the detection zone 32, sleeves or ferrules 87 upstream and downstream of the detection zone 32 support the capillary column 10 in the body of the cartridge 60. External excitation fiber 34 and emission fiber 36 supported in the CE instrument are aligned with the detection zone 32 through the detection window 86 defined in the separation channel/column 10. In the illustrated embodiment that will be further discuss below, the excitation fiber 34 and emission fiber 36 are supported by the fork assembly in the CE instrument (see FIG. 10, for example). The axes of the fibers 34 and 36 and the capillary column 10 are coplanar. The ball ends of the fibers 34 and 36 are in proximity to but not touching the capillary column 10. In other words, the optical fiber has a terminating integral ball-end structure that is spaced apart from exterior of the separation channel, wherein the ball-end structures do not touch exterior of the separation channel. This conforms to the detection optic configuration shown in FIG. 1B.

As illustrated, the cartridge 60 has separate channels defined by the separate cartridge elements 60'. The flow within each cartridge element 60'/channel is separate from another cartridge element/channel, as each channel is provided with its separate reservoir. This allows the chemistry of the buffer medium, and the characteristics of the capillaries (e.g., capillary size, coating and effective separation length), to be separately defined for each cartridge element 60', which may be different from one another. Further, different cartridges 60 can be easily interchanged for use in the CE instrument discussed below to suit the particular sample based separation. The cartridges may be replaced, reconditioned for reuse (e.g., with fresh buffer, seals, new capillary column and/or electrodes, etc.), recycled, or disposed.

The cartridge in accordance with the present invention can be manufactured with relatively low cost. The body of the cartridge can be made of injection molded plastic (e.g., PVC, polyurethane, polycarbonate, acetal, etc. The electrodes can be made of stainless steel. The ferrules could be made of injected molded plastic material or aluminum or glass machined parts.

In the illustrated embodiment, the overall size of the cartridge 60 is less than 20 cm in length (e.g., about 11 to 15 cm), and less than 3 cm in thickness (e.g., 2 to 3 cm). The length of capillary column 10 that can be accommodated in the cartridge 60 is less than 50 cm (e.g., about 11 to 15 cm), with an effective separation length of 11.5 cm. The capacity of the reservoir 62 is less than 20 cc (e.g., about 10 to 20 cc).

Figure 8A:
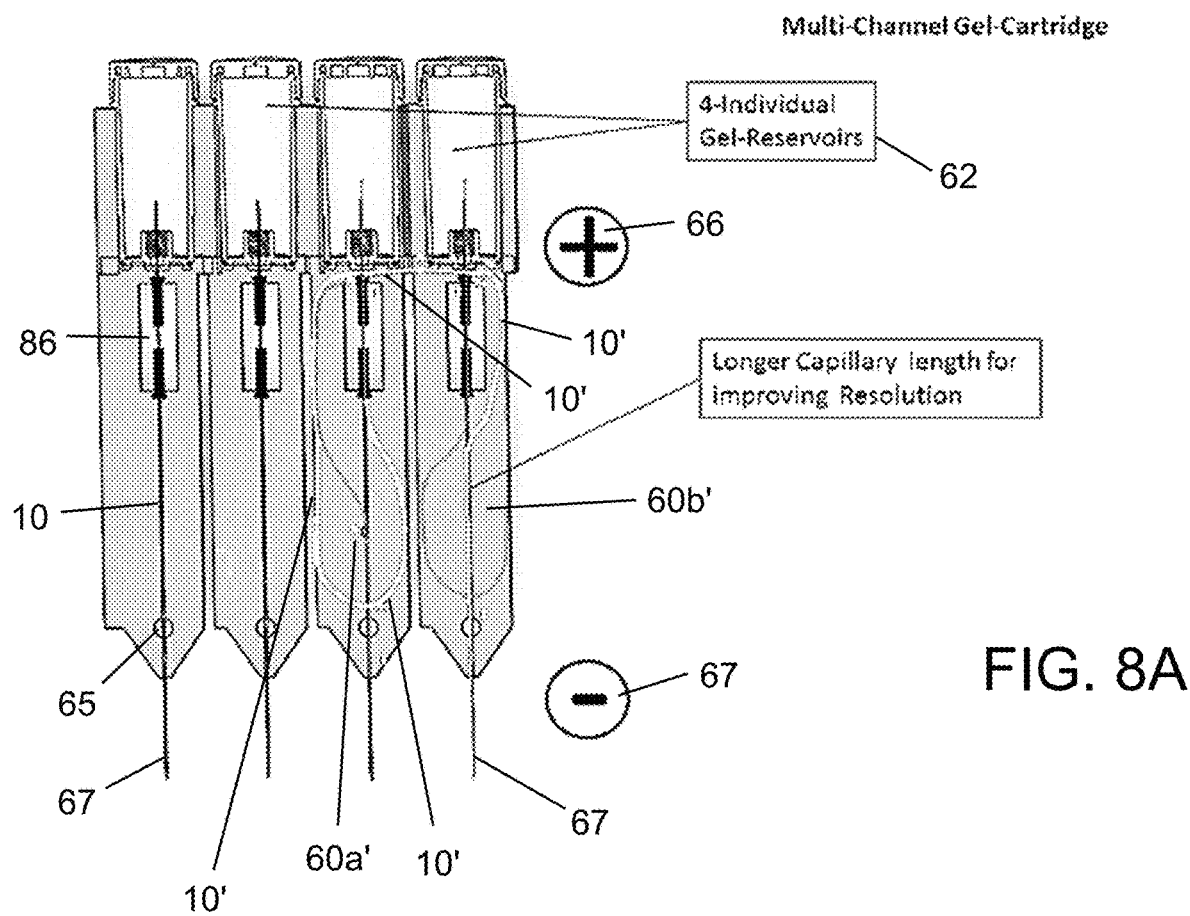
FIGS. 8A and 8B illustrate internal routing of capillary tubes within the cartridge, in accordance with one embodiment of the present invention.
Figure 8B:
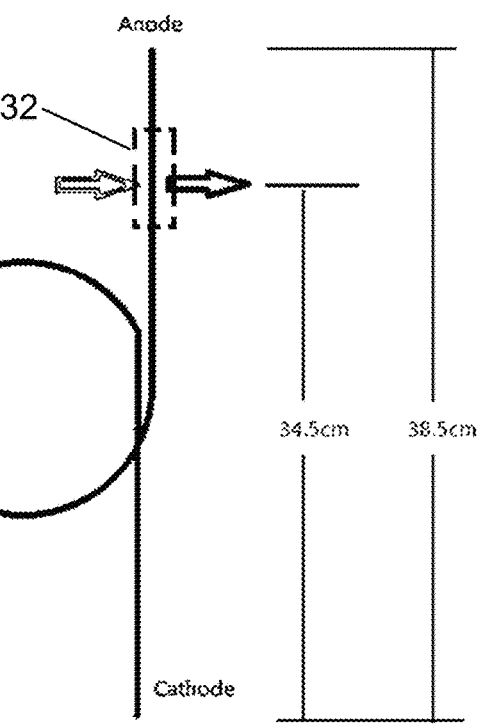

Referring to FIG. 8A, the capillary column 10 may be routed from the reservoir 62 (having the anode 66) to the corresponding cathode 67 within the same cartridge element 60'. In another embodiment, a capillary column may be routed between the reservoir/electrode (anode) of one channel to an electrode (cathode) in a another channel, thus allowing a longer length of capillary tube to be used to define a longer separation channel. As illustrated in FIG. 8A, the capillary column 10' is routed between the reservoir 62 (anode 66) of cartridge element 60a' to the cathode 67 of the adjacent cartridge element 60b'. This provides a longer effective separation length, which can significantly improve resolution of separated bases (as will be discussed in connection with FIG. 12 below). FIG. 8B shows that a length of capillary column of 38.5 cm having an effective separation length of 34.5 cm may be looped within the cartridge 60, via two or more cartridge elements 60', without having to use a cartridge having a longitudinal length of greater than the effective separation length in order to accommodate the capillary column.

Cartridge Interface Mechanism

The cartridge interface mechanism 204 is supported in the receiver block 205 having an opening sized and configured to receive the cartridge 60 as shown (e.g., FIGS. 9A to 9D). The receiver block 205 is supported on the chassis of the instrument, and is configured to receive the cartridge 60, and index its location positively and accurately with respect to the detection optics 210. As shown in FIG. 3E, for example, the right most cartridge element 60' is wider than the left most cartridge element 60'. In addition, the left side of the top portion of the left most cartridge element 60' protrudes slightly as compared to the right side of the top portion of the right most cartridge element 60'. These features provide guides to facilitate positive and accurate positioning and alignment of the detection window 86 in the cartridge 60 with respect to the fork assemblies 230 discussed below, when the cartridge 60 is properly inserted into the CE instrument.

In this illustrated embodiment, the cartridge 60 is support by the receiver block 205 in a vertical orientation, with the longitudinal axis of the capillary column 10 substantially vertical with respect to the horizontal plane of the tray 220. It is within the scope of the present invention to have the cartridge supported with its longitudinal axis horizontal with respect to reagent/sample containers. A safety interlocking feature may be provided to engage to prevent the cartridge 60 from being accidentally removed from the receiver block 205 during electrophoresis operations. The safety interlock feature could also include the front door (sample-door) 260 for tray 220 and top door (cartridge-door) 261 for insertion of the cartridge 60, to prevent user accidentally opening these doors during electrophoresis operations. The safety interlock (not shown) will only be released upon execution of termination sequence for an electrophoresis run (e.g., shutting down high voltage supply, and outward movement of the fork assemblies 230 described below). The receiver block 205 also includes an RFID reader/transmitter (e.g., on the outside of the receiver block 205) for communicating with an RFID label on the capillary cartridge 60.

Figure 10B:
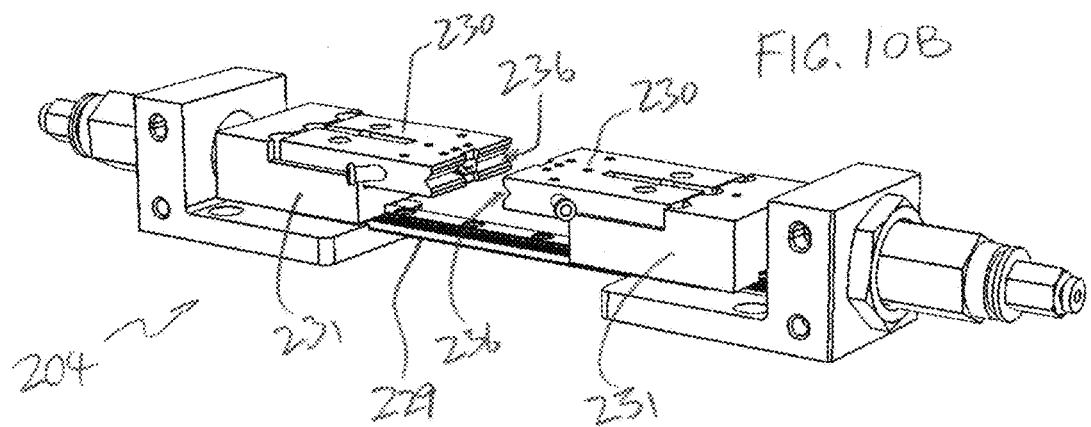
Figure 10C:
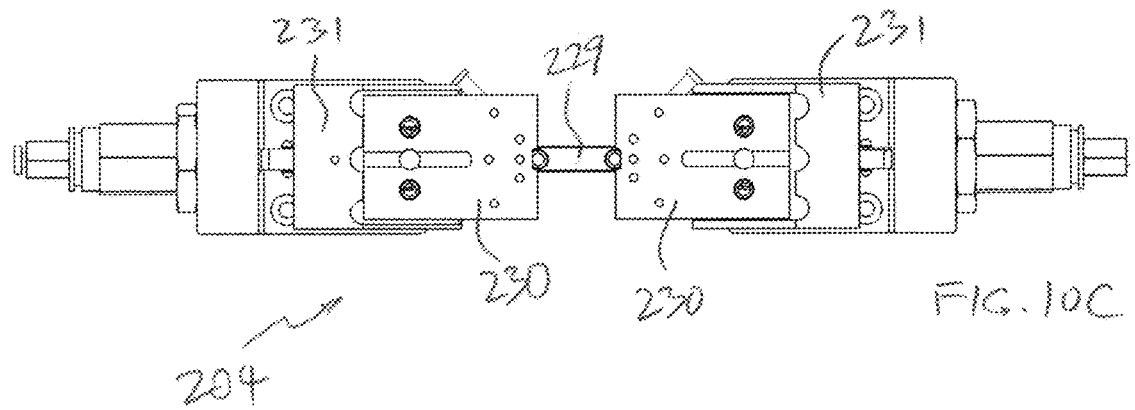

The cartridge interface mechanism 204 comprises a pair of opposing fork assemblies 230 for each channel. For each pair of fork assemblies 230, track 229 is provided to allow actuated movement of opposing fork assemblies to engage the respective fork assemblies to the ferrules 87 in the cartridge element 60'. Referring also to FIGS. 10A to 10C, the fork assemblies 230 are attached to slides 231, which are actuated to be slidable along the tracks 229 towards and away from each other. In other words, in the illustrated embodiment, the fork assemblies 230 are supported to slide along a same axis. The excitation fiber 34 and emission fiber 36 are each supported on a separate fork assembly 230. The fork assemblies 230 are configured to position the ball shaped ends of the excitation fiber 34 and the emission fiber 36 in proximity to the detection zone 68 of the capillary column 10 for detection of separated sample analytes. Movements of the fork assemblies 230 may be implemented by pneumatic or electromagnetic actuation. In the illustrated embodiment, the fork assemblies 230 are moved by pneumatic pistons 233, which may make use of the supply of pressurized gas 212 regulated by appropriate valve(s) (not shown) controlled by the system board 201.

The cartridge 60 is positioned with respect to the fork assemblies 230 in a manner such that for each channel, the opposing fork assemblies 230 are positioned on opposite lateral sides of the cartridge 60, wherein the fork assemblies move between a first position in which the first and second fork assemblies do not extend into the detection window defined in the cartridge element 60', and a second position in which the first and second fork assemblies extend into the detection window defined in the cartridge element 60'. The fork assemblies 230 essentially move between a first position at which the fork assemblies are apart to allow the cartridge element 60' to be inserted between the fork assemblies 230, to a second position at which the fork assemblies are pressing against the ferrules 87 (interlocked) in the detection window 86 in the cartridge 60.

In the illustrated embodiment, there are four pairs of fork assemblies 230 arranged in parallel, each in the orientation shown in FIG. 10A (i.e., with the plane of the fork assemblies 230 being vertical. The track 229 of some of the pairs of fork assemblies would in the space between adjacent cartridge elements 60'.

Figure 10D:
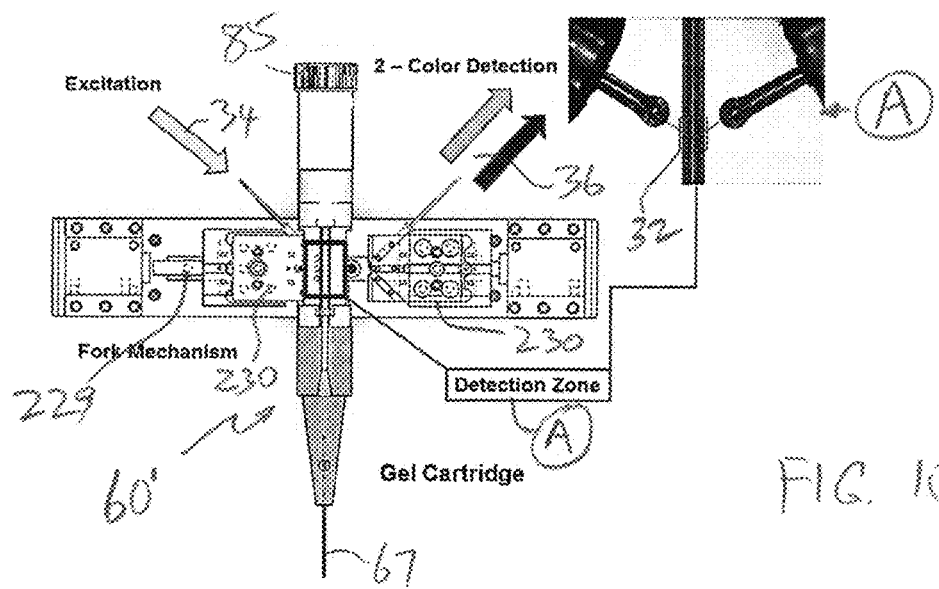

The extended portion of the fork assemblies 230 are provided with a complementary surface that facilitates alignment of the extended surface against the ferrule 87, e.g., a V-groove or concave surface 236 to complement the cylindrical body of the ferrules 87. FIG. 10D is a simplified view that illustrates the left fork assembly 230 (the one having the excitation fiber 34) pressed against the ferrules 87 (with a cartridge element 60' schematically illustrated). At this position, the concave surfaces 236 extend into the detection window 86 in the cartridge element 60'. In this position, the optical fiber supported on the left fork assembly 230 delivers radiation to the capillary column 10. With the right fork assembly 230 also engaging the ferrules 87 in the cartridge element 60', the detection optical fiber supported on the right fork assembly 230 collects radiation from the detection zone 32. In the particular illustrated embodiment, radiation induced fluorescence detection scheme is implemented, but other types of optical detection schemes may be implemented instead without departing from the scope and spirit of the present invention. Both fork assemblies 230 may be controlled to move together to press against the ferrules 87 at about the same time, or move separately to press against the ferrules 87 in sequence. In the illustrated embodiment, the ferrules 87 provide a stop against the extended surfaces of the fork assemblies 230, so that the terminating integral ball-ends of the optical fibers do not touch the exterior surface of the capillary column, but are spaced apart from the exterior surface of the capillary cartridge at a predetermined distance, which can be repetitively maintained when the fork assemblies are actuated between the first and second positions described above.

While the illustrated embodiment in FIG. 1B shows the optical fibers oriented in a V-configuration, the optical fibers may be configured in a straight or in-line fashion (e.g., for absorbance type detection scheme), or with one or both optical fibers configured with axis perpendicular to the axis of the capillary column. Further, only one fork assembly may be used, with both radiation delivering fiber and radiation collection fiber on the same fork assembly.

The system board 201 controls various functions of the CE instrument 200, including positioning the sample and buffer tray 220 with respect to the cartridge 60 held in the receiver block 205, and above described functions of the cartridge interface mechanism 205, and other functions, such as detecting end of a run and release of safety lock to release the cartridge 60 from the receiver block 204.

System Operation for Electrophoresis

To conduct a desired electrophoresis run, a user presets the appropriate parameters using the controller 26. A cartridge 60, having the appropriate separation support medium (buffer) and a capillary column 10 having the desired size and coating in each cartridge element 60', is inserted into the receiver block 205. The controller 26 in association with the system board 201 takes over control of the CE instrument 200, to undertake the tasks described below.

The cartridge is "locked" in the receiver block 205 upon proper insertion, with the detection window 86 of each cartridge element 60' appropriately positioned with respect to the fork assemblies 230. For each cartridge element 60', pressurized gas is readied from its source, when the top door 261 is closed to press the O-ring of the air outlet against the top of the cap 85 of the cartridge reservoir 62 to access the port 64 on the cartridge reservoir 62. The electrical contact probes 224 and 225 are pressed against the electrodes 66 and 67. The fork assemblies 230 are moved to mate against the ferrules 87 in the detection window 86.

By a combination of X, Y and Z-directions, the sample transport mechanism positions the appropriate wells in the sample and buffer tray 220 with respect to the depending tip of the capillary column 10 supported in each cartridge element 60'. If necessary, the separation buffer that is present in the capillary column 10 is initially purged by application of pressurized gas into the cartridge reservoir 62 (the tray 220 may be moved to position a specific well for collecting waste from the capillary column), and/or fresh separation buffer from the reservoir is caused to fill the separation channel.

One or more test sample that are placed in one or more wells on the tray 220, and the tray 220 is positioned to submerge the depending tip of the capillary column 10 and the end of electrode 67 of each cartridge element 60'. The sample is introduced into the separation capillary column 10 by electro kinetic injection (appropriate high voltage applied for a defined period of time, e.g., less than 60 seconds, e.g., 5 to 10 seconds), a procedure well known to one skill in the art.

A buffer reservoir in the tray 220 is then positioned to submerge the tip of the capillary column 10 and the end of electrode 67. Electrophoresis is carried out by application of high voltage at an appropriate level for a defined period of time for the particular sample and separation buffer medium. During the run, data corresponding to radiation-induced fluorescence is collected via the PMT 206. The data is stored in an electronic file. At the end of the run, the tray 220 is lowered.

If no further runs, the cartridge 60 may be removed by executing a preset release procedure, including releasing the pressurized gas supply, moving the fork assemblies 230 away from the cartridge elements 60' (as described above), disengaging the electrodes 66 and 67 by the contact probes 224 and 225 (if they are actuable), and releasing the lock on the cartridge 60. The cartridge 60 can thus be removed, and replaced with another cartridge for a next run at a desired time.

If further runs are desired for same or additional samples, the old buffer (e.g., gel buffer) from the previous run is purged into the waste well from the capillary column 60 by pressuring the reservoir to refill the capillaries with fresh buffer. The tray 220 is positioned so that the tip of the capillary column 60 in each cartridge element 60' is cleaned with cleaning solution (in a well), before another sample is loaded into the capillary column 60 and electrophoresis run conducted as described earlier.

It is noted that because the sample analytes that flowed to the buffer reservoir 62 at the exit of the capillary column are in such small amount and volume concentration compared to the volume of the reservoir, and that the analytes are expected to be mixed within the gel reservoir, there will only be a negligible trace of analytes from past runs in the reservoir, and that will be evenly distributed in the gel that refills the capillary column for subsequent runs. Any noise from this negligible trace would be relatively small background noise that can be easily removed from the detected signal in the data analysis.

If no further runs, the cartridge 60 may be removed by executing a preset release procedure, including releasing the pressurized gas supply, moving the fork assemblies 230 away from the cartridge 60 (as described above), disengaging the electrodes 66 and 67 by the contact probes 225 and 225 (if they are actuable), and releasing the lock on the cartridge 60. The cartridge 60 can thus be removed, and replaced with another cartridge for a next run at a desired time.

The above-mentioned sequence of process may be programmed as one of the automated functions of the controller 26.

Figure 12:
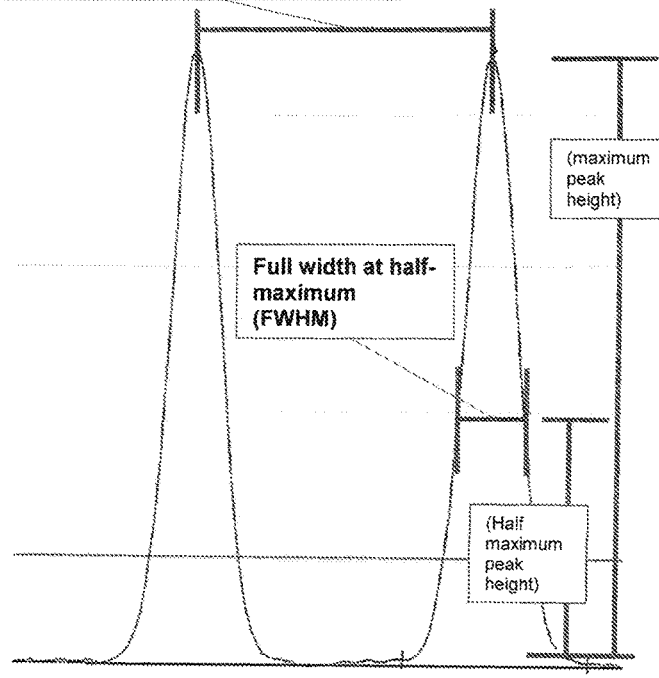
FIG. 12 illustrates determination of resolution of bases from separation.

The collected data is analyzed by using appropriate application software routines. Referring to FIG. 12, the resolution of the peak separation interval (time and #bases) is determined using a Full Width at Half Maximum (FWHM) approach.

Resolution (bases)=Peak Separation Interval (#bases)/ (Peak Separation Interval (time)/FWHM (time)).

Typically a 15 cm long capillary (with effective length of 11.5 cm) with an I.D. of 20-100 μm (typically 70 μm) is used for each cartridge/channel for DNA Fragment analysis. The resolution achieved for 155 bp (base pairs) is 1.95 using POP-7 gel. With the new design of Qsep400 one could use longer length of capillary (see FIGS. 8A and 8B) within the 4-channel cartridge module. For a total length of 38.5 cm (with effective length of 34.5 cm) filled with POP-7 Polymer separation matrix/denaturing-gel (Applied Biosystems, Life Technology/ThermoFisher Scientific, Carlsbad Calif.), one can achieve a resolution of 0.675 for the 150 bp and 160 bp (Peak Separation Interval of 29.64 seconds with FWHM=2.0 seconds), when testing with the GX500-ROX DNA ladder (end-labeled ssDNA from Applied Biosystems; Life Technologies/ThermoFisher Scientific, Carlsbad Calif.). [Applying the above formula for resolution, the resolution achieved=(160−150)/(29.64 sec/2.0 sec)=0.675.]

Figure 13:
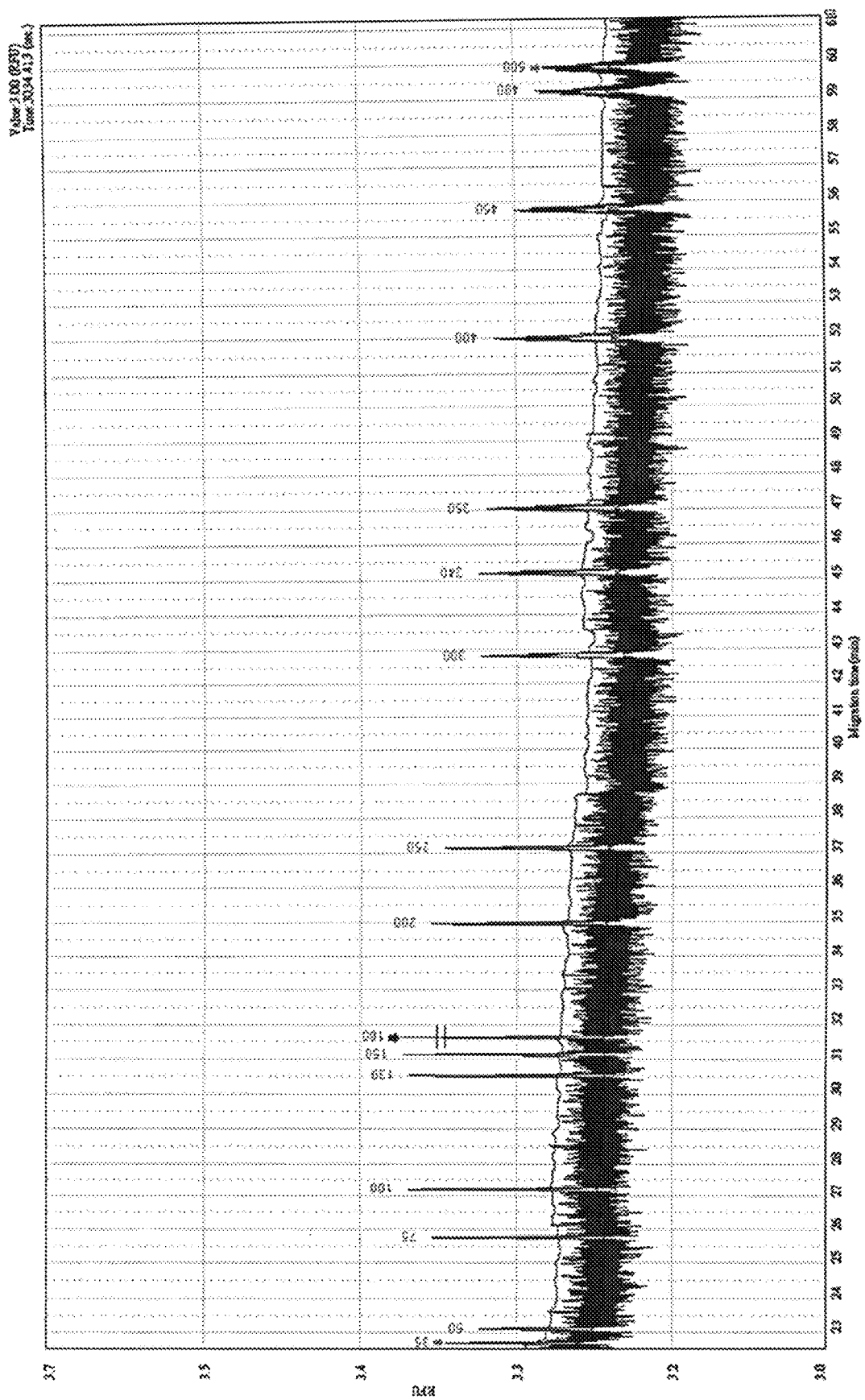
FIGS. 13-15 illustrate resolution of fluorescence detection of by the inventive CE instrument and method in accordance with the present invention.
Figure 14:
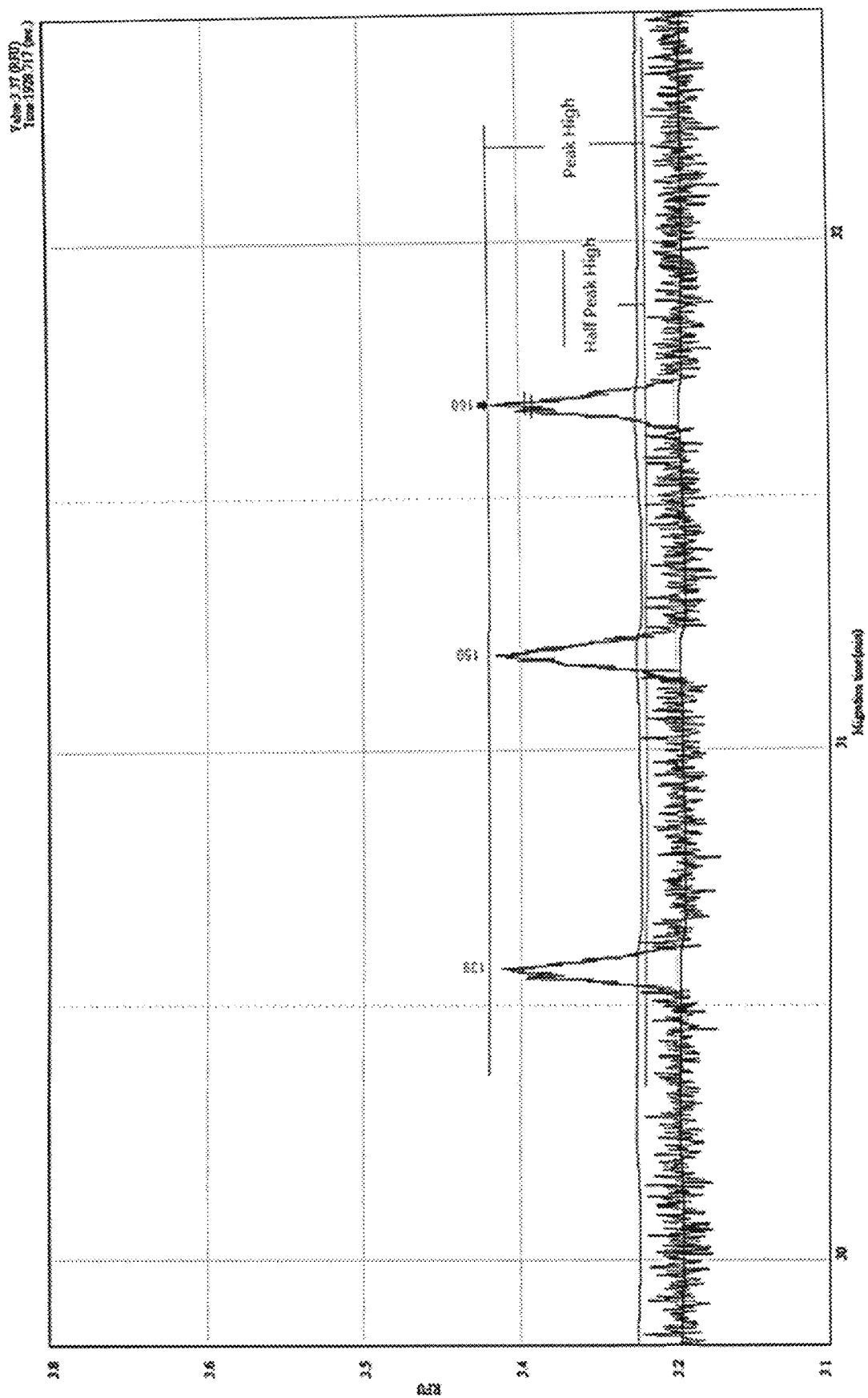
Figure 15:
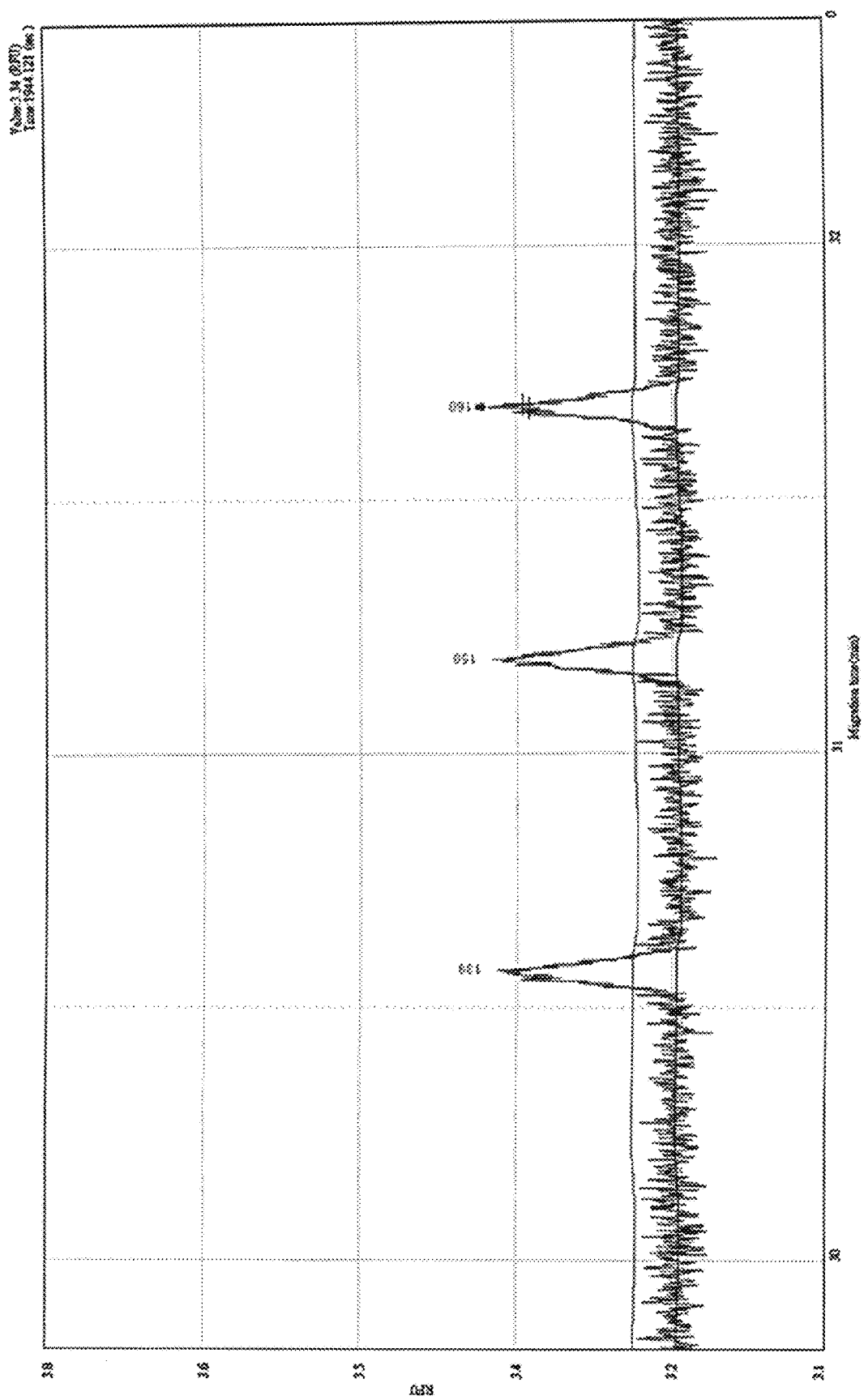

From a mechanical packaging perspective, the longer capillary could be looped between two electrodes of either the single channel or could be routed/looped from the electrode of one channel to the $2^{nd}$ $3^{rd}$ or $4^{th}$ channels/electrode (see, FIGS. 8A and 8B). FIGS. 13 to 15 illustrate the comparison of resolution of 150-160 bp of GX500-ROX with longer capillary (FIG. 13), and resolution of 150-160 bp of GX500-ROX with longer capillary (Zoom) with Resolution of 0.675 (FIGS. 14 and 15). FIGS. 14 and 15 is the zoomed in section of FIG. 15 for the 150-160 bases and the FIG. 12 elaborates on how we achieved the 0.675 by using the formula Example: Resolution=(160−150)/(29.64 sec/2.0 sec)
=0.675 to achieve it.

Figure 11:
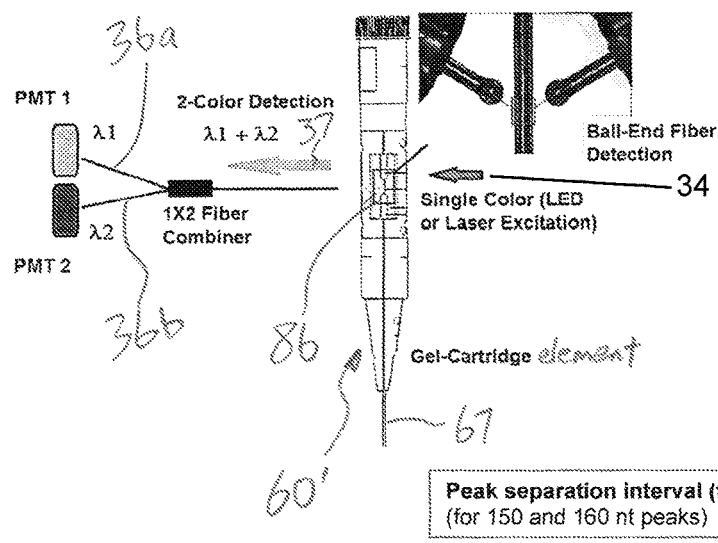
FIG. 11 schematically illustrates a two-color detection scheme in accordance with one embodiment of the present invention.

FIG. 11 illustrates one embodiment of two-color detection, including a fiber combiner/splitter 61 for splitting an emission signal 37 into two signals for fluorescence detection at two different wavelengths. The 1×2 fiber combiner/splitter 61 couples the output signal 37 of the emission fiber 36 to the inputs of a first emission fiber 36a and a second emission fiber 36b. The emission fiber 36 includes fluorescence at at least two wavelengths λ1 and λ2. In this embodiment, λ1 corresponds to the wavelength of the fluorescence of detected Dextran Ladder and λ2 corresponds to the wavelength of the fluorescence of detected glycan profile. The first emission fiber 36a routes emissions from the emission fiber 36 to a first PMT1 that detects fluorescence at λ1, and the second emission fiber 36b routes emissions from the emission fiber 36 to a second PMT2 that detects fluorescence at λ2. The fiber combiner may be of the type that splits orthogonal polarizations at at least two wavelengths (e.g., at λ1 and λ2) or two ranges of wavelengths (e.g., Thorlabs 1X2 Coupler or Gould 1X2 Fiber Splitter). In addition, while not shown in FIG. 6, one or more band-pass filters may be provided between the PMT1 and/or PMT2 and the corresponding outputs of the first and/or second emission fibers 36a and 36b. Another embodiment of two-color detection is to utilize a dichroic filter/beam-splitter to split an emission signal 37 into two emission signals for fluorescence detection at two different wavelengths. An example of an appropriate beam-splitter may be a model no. DMLP P425 longpass type Dichroic Mirror available from Thor-Labs, Inc., which has a 45° angle of incident, a cutoff wavelength of 425 nm, with a transmission band of 440-700 nm, and a reflectance band of 380-410 nm. In addition, while not shown in FIG. 11, one or more band-pass filters may be provided between the PMT1 and/or PMT2 and the corresponding outputs of the first and/or second emission fibers 36a and 36b. Further details of dual color detection approach can be found in U.S. Patent Application Publication No. US20150338347A1, commonly assigned to the assignee of the present invention, which had been incorporated by reference herein.

In accordance with the present invention, fluorescence detection is improved by being able to conduct 2-Color Detection for accurate peak identification. A single excitation (LED or Laser) is used to excite 2 different fluorophores for each separation channel. One emission dye (fluorophore) is used for the sample and the second dye (fluorophore) is used for the reference ladder (DNA Ladder or Glycan Ladder: i.e Dextran) run with two detectors (PMTs). The results from both detectors are synchronized and displayed on top of each other (transposed electropherograms) using the post data collection analysis software (post CE separation analysis) for accurate peak identification.

Figure 16:
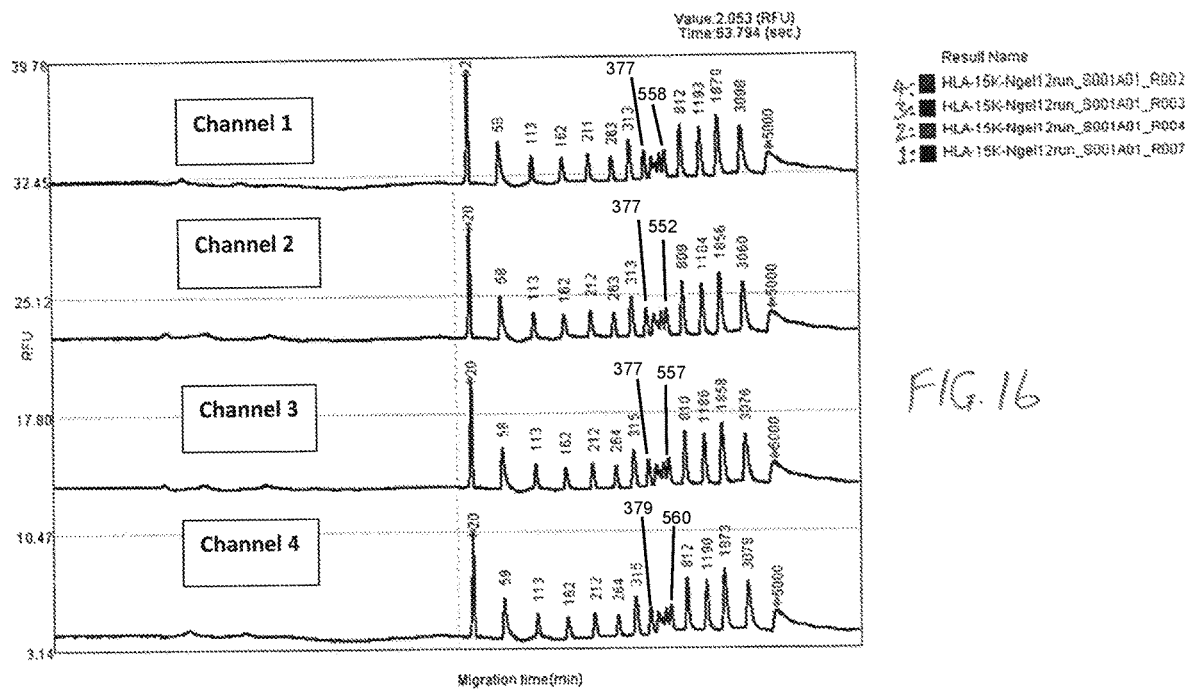
FIGS. 16-19 illustrate results of fluorescence detection by the inventive CE instrument and method in accordance with the present invention.
Figure 17:
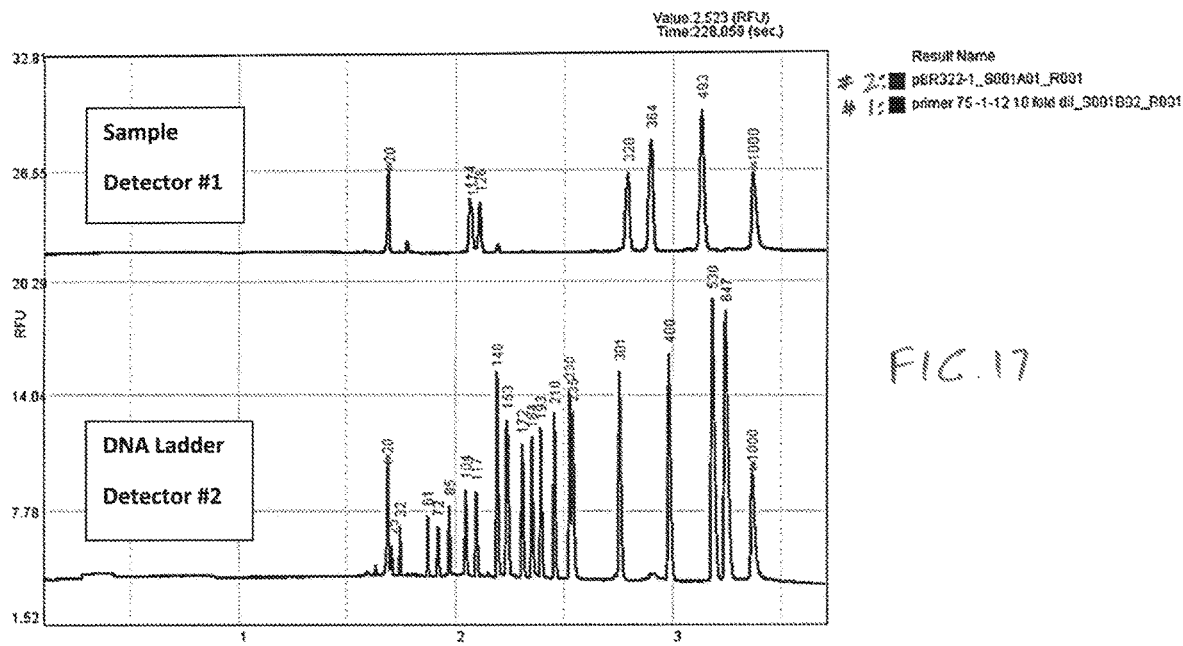
Figure 18:
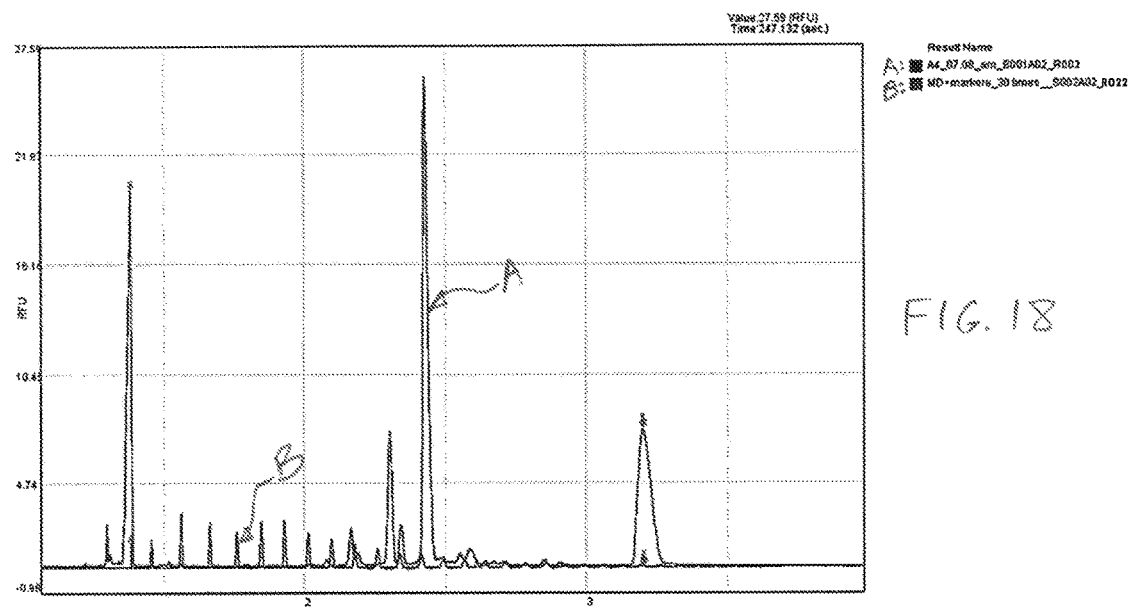
Figure 19:
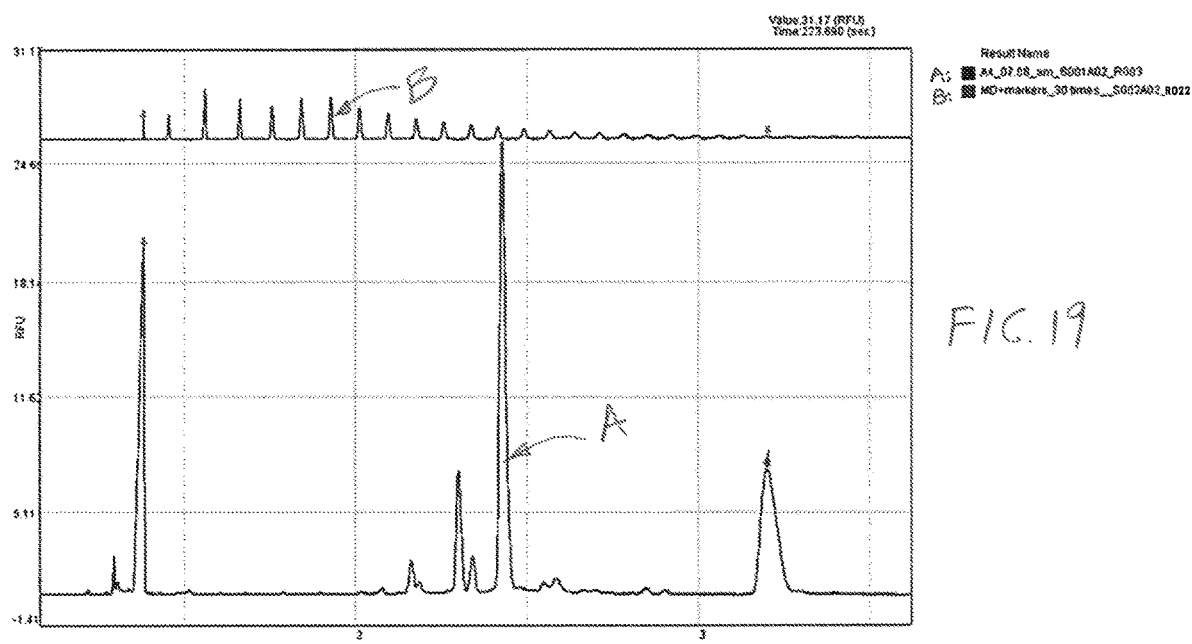

FIGS. 16 to 19 illustrate the result of various runs using the CE instrument disclosed above. Specifically, FIG. 16 shows the result of 4-Channel runs of DNA Ladder (range of 20-5000 bp) in less than 1-minute; FIG. 17 shows the result of 2-Color detection (Detector #1+Detector #2) in the range of 20-1000 bp; FIG. 18 shows the result of Glycan Ladder (Detector 1) transposed on top of the glycan sample (Detector 2); FIG. 19 shows the result of Glycan Ladder (Detector 1) and the glycan sample (Detector 2) displayed individually and aligned by the arrows.

Using the CE system described above to perform glycan profiling, it has been found that the present invention provides a cost-effective capillary gel-electrophoresis system for highly efficient, high speed, high throughput, glycan analysis (N-Glycan). The novel method and system significantly increase the pace at which glycoprotein research is performed in the laboratory, saving hours of preparation time and assuring accurate, consistent and economical results.

The two-color detection simplifies and shortens sample separation and detection into a single run and assures accurate data analysis for peak identification. The dual dye detection (i.e., two dye labeling) is a very robust and accurate way to provide reproducible peak identification and sizing for glycan profiling.

The simplicity of the micro-optical detection also provides flexibility in designing higher throughput (i.e., multi-channel) type gel-cartridge without the use of optics (excitation or emission optics) inside the cartridge assembly, hence reducing costs for the cartridge.

Accordingly, the new fluorescence fiber-based detection for the CE system in accordance with the present invention provides simplicity in design, ease of operation and lower cost consumable (e.g., for glycan profiling. It provides a good solution particularly for the research and clinical diagnostic laboratories/industry that demands sustained and stable recurring revenue streams from both an installed base of instruments and recurring need for consumables such as testing reagents and buffer containing capillary cartridge.

While the invention has been particularly shown and described with reference to the preferred embodiments, it will be understood by those skilled in the art that various changes in form and detail may be made without departing from the spirit, scope, and teaching of the invention.

We claim:

1. A multi-channel cartridge for bio-separation which is configurable to accommodate a desired one of a shorter capillary column and a longer capillary column, comprising:
  a plurality of cartridge elements, wherein each cartridge element comprises:
    a body defining an opening as a detection window for receiving external detection optics;
    at least one of the shorter capillary column and the longer capillary column supported in the body;
    a reservoir attached to a first end of the body in fluid flow communication with a first end of the at least one of the shorter capillary column and the longer capillary column, wherein the reservoir is dedicated to a single cartridge element;
an anode, wherein the anode is conductively coupled to fluid contained in the reservoir; and
a cathode disposed at a second end of the body,
wherein the plurality of cartridge elements are coupled,
wherein the reservoirs of the respective cartridge elements are not in flow communication,
wherein the anodes of the respective cartridge elements are not conductively coupled in the multi-channel cartridge, and
wherein in a first configuration the longer capillary column is configured to be routed to extend between the reservoir of a first cartridge element and the cathode of a second cartridge element via an opening provided between and interconnecting the first and second cartridge elements to expose a section along the longer capillary column in the detection window of the first cartridge element, and in a second configuration the shorter capillary column is configured to extend between the reservoir of the first cartridge element and a cathode of the first cartridge element to expose a section along the shorter capillary column in the detection window of the first cartridge element, and wherein the first and second cartridge elements are each structured to accommodate the first and the second configurations.

2. The multi-channel cartridge as in claim 1, wherein the plurality of cartridge elements are coupled in a series in a plane, and wherein the bodies of two adjacent cartridge elements are interconnected to allow the longer capillary column to pass through.

3. The multi-channel cartridge as in claim 1, wherein the detection window of the first cartridge element exposes a section along the at least one of the shorter capillary column and the longer capillary column, to which the external detection optics are aligned through the detection window.

4. The multi-channel cartridge as in claim 3, wherein the longer or shorter capillary column is supported coaxially by two ferrules that are supported in the body, wherein each of the ferrules is cantilevered by the body and having an end extending into the detection window, and wherein a detection zone along the at least one of the shorter capillary column and the longer capillary column is exposed between the extended ends of the ferrules.

5. The multi-channel cartridge as in claim 1, the body is generally longitudinal and blade shaped.

6. The multi-channel cartridge as in claim 5, wherein the at least one of the shorter capillary column and the longer capillary column is supported along a central axis of the body.

7. The multi-channel cartridge as in claim 1, wherein in each cartridge element, the body has a body section from which the second end of the body extends, wherein the body section has a width, and wherein the second end of the body is narrower than the width of the body section.

8. The multi-channel cartridge as in claim 7, wherein the second end of the body tapers from the body section to a narrower end.

9. A bio-separation system, comprising:
a chassis,
a multi-channel cartridge as in claim 1, supported by the chassis;
a table supporting at least a tray containing a sample and a buffer and positioning the tray with respect to an extended end of at least one capillary column;
at least one fork assembly supporting detection optics, wherein the at least one fork assembly is movable to extend into the detection window defined in each cartridge element;
a separation mechanism effecting bio-separation within the at least one capillary column; and
a controller controlling movement of the at least one fork assembly and the separation mechanism to effect separation.

10. The bio-separation system as in claim 9, wherein the at least one fork assembly comprises a first fork assembly and a second fork assembly, wherein the detection optics comprises first optics supported by the first fork assembly directing incident radiation to a detection zone and second optics supported by the second fork assembly collecting radiation from the detection zone.

11. The bio-separation system as in claim 10, wherein the first and second fork assemblies are positioned on opposite lateral sides of the multi-channel cartridge, wherein the first and second fork assemblies move between a first position in which the first and second fork assemblies do not extend into the detection window defined in each multi-channel cartridge, and a second position in which the first and second fork assemblies extend into the detection window defined in each multi-channel cartridge.

12. The bio-separation system as in claim 9, further comprising a temperature control mechanism to control the temperature of the sample in the tray.

13. A bio-separation system, comprising:
a chassis,
a multi-channel cartridge as in claim 1, supported by the chassis;
a table supporting at least a tray containing a sample and a buffer with respect to an extended end of the at least one of the shorter capillary column and the longer capillary column;
a plurality of fork assemblies supporting detection optics, wherein the fork assemblies are movable to extend into the detection window defined in each cartridge element, and wherein each cartridge element is provided with at least one fork assembly;
a separation mechanism effecting bio-separation within the at least one of the shorter capillary column and the longer capillary column; and
a controller controlling movement of the fork assemblies and the separation mechanism to effect separation.

14. A multi-channel cartridge for bio-separation which is configurable to accommodate a shorter capillary column and a longer capillary column, comprising:
a body defining a plurality of openings as detection windows of a plurality of cartridge elements for receiving external detection optics;
a plurality of reservoirs coupled to a first end of the body, each corresponding to a separate one of the plurality of detection windows,
a plurality of capillary columns, including the shorter capillary column and the longer capillary column, each having a first end in fluid flow communication with a separate one of the plurality of reservoirs, and a second end extending away from the corresponding separate one of the plurality of reservoirs to a distal end of the body,
a plurality of anodes, wherein each of the plurality of anodes is conductively coupled to fluid contained in a corresponding reservoir, wherein the plurality of anodes of the corresponding reservoirs are not conductively coupled in the multi-channel cartridge; and a plurality of cathodes disposed at a second end of the body, wherein in a first configuration the longer capillary column is configured to be routed to extend between a first reservoir and a cathode corresponding to a second reservoir via an opening providing between and interconnecting two adjacent cartridge elements to expose a section along the longer capillary column in the detection window corresponding to the first reservoir, and in a second configuration the shorter capillary column is configured to extend between a third reservoir and a cathode corresponding to the third reservoir to expose a section along the shorter capillary column in the detection window corresponding to the third reservoir, and wherein the body is structured to accommodate the first and the second configurations.

* * * * *